(12) United States Patent
Takidis et al.

(10) Patent No.: US 10,220,971 B2
(45) Date of Patent: Mar. 5, 2019

(54) TENSIONING DEVICE FOR A STRAPPING DEVICE

(71) Applicant: Signode Industrial Group LLC, Glenview, IL (US)

(72) Inventors: Dimitrios Takidis, Dubendorf (CH); Hans Huber, Hagglingen (CH); Michael Meng, Gipf-Oberfrick (CH); Roland Widmer, Haar (DE); Christian Benz, Zurich (CH)

(73) Assignee: Signode Industrial Group LLC, Glenview, IL (US)

( * ) Notice: Subject to any disclaimer, the term of this patent is extended or adjusted under 35 U.S.C. 154(b) by 360 days.

(21) Appl. No.: 15/117,416

(22) PCT Filed: Feb. 10, 2015

(86) PCT No.: PCT/CH2015/000013
§ 371 (c)(1),
(2) Date: Oct. 6, 2016

(87) PCT Pub. No.: WO2015/117254
PCT Pub. Date: Aug. 13, 2015

(65) Prior Publication Data
US 2017/0015451 A1     Jan. 19, 2017

(30) Foreign Application Priority Data

Feb. 10, 2014 (CH) .......................................... 181/14
Feb. 10, 2014 (CH) .......................................... 182/14
Feb. 10, 2014 (CH) .......................................... 183/14

(51) Int. Cl.
*B65B 13/06* (2006.01)
*B65B 13/22* (2006.01)

(52) U.S. Cl.
CPC .............. *B65B 13/22* (2013.01); *B65B 13/06* (2013.01)

(58) Field of Classification Search
CPC ....... B65B 13/02; B65B 13/025; B65B 13/18; B65B 13/185; B65B 13/22; B65B 13/24
(Continued)

(56) References Cited

U.S. PATENT DOCUMENTS 3,367,374 A    2/1968   Meier et al.
3,654,033 A    4/1972   Angarola et al.
(Continued)

FOREIGN PATENT DOCUMENTS

CA    2 432 353     12/2003
CH      705 745      5/2013
(Continued)

OTHER PUBLICATIONS

International Search Report and Written Opinion for International Application No. PCT/CH2015/000013 dated May 18, 2015.
(Continued)

*Primary Examiner* — Shelley M Self
*Assistant Examiner* — Jared O Brown
(74) *Attorney, Agent, or Firm* — Neal, Gerber & Eisenberg LLP

(57) ABSTRACT

The present disclosure relates to a tensioning device of a strapping device for strapping packaged material with a strap. The tensioning device includes a tensioning wheel operatively connectable to a drive device to rotate the tensioning wheel about a rotational axis. The tensioning wheel has a circumferential surface configured to engage the strap. The tensioning device also includes a movable spacer provided on the tensioning wheel in the region of the circumferential surface of the tensioning wheel. The spacer is movable between a first position in which part of the
(Continued)

spacer is a first distance from the rotational axis and a second position in which the part of the spacer is a second different distance from the rotational axis. The spacer projects beyond the circumferential surface of the tensioning wheel in at least one of the positions.

12 Claims, 12 Drawing Sheets

(58) Field of Classification Search
USPC .................................................... 100/29, 32
See application file for complete search history.

(56) References Cited

U.S. PATENT DOCUMENTS

| | | | |
|---|---|---|---|
| 4,011,807 | A | 3/1977 | Kobiella |
| 4,015,643 | A | 4/1977 | Cheung |
| 4,050,372 | A | 9/1977 | Kobiella |
| 4,240,865 | A | 12/1980 | Kyts |
| 4,313,779 | A | 2/1982 | Nix |
| 4,450,032 | A | 5/1984 | Wehr |
| 4,535,730 | A | 8/1985 | Allen |
| 4,572,064 | A | 2/1986 | Burton et al. |
| 4,707,390 | A | 11/1987 | Cheung |
| 4,776,905 | A | 10/1988 | Cheung et al. |
| 5,133,532 | A | 7/1992 | Figiel et al. |
| 5,146,847 | A | 9/1992 | Lyon et al. |
| 5,155,982 | A | 10/1992 | Boek et al. |
| 5,159,218 | A | 10/1992 | Murry et al. |
| 5,379,576 | A | 1/1995 | Koyama et al. |
| 5,516,022 | A | 5/1996 | Annis, Jr. |
| 5,689,943 | A | 11/1997 | Wehr |
| 5,690,023 | A | 11/1997 | Stamm et al. |
| 5,798,596 | A | 8/1998 | Lordo |
| 5,809,873 | A | 9/1998 | Chak et al. |
| 6,003,578 | A | 12/1999 | Chang |
| 6,109,325 | A | 8/2000 | Chang |
| 6,308,760 | B1 | 10/2001 | Finzo et al. |
| 6,332,306 | B1 | 12/2001 | Finzo et al. |
| 6,405,766 | B1 | 6/2002 | Benjey |
| 6,516,715 | B1 | 2/2003 | Reiche |
| 6,578,337 | B2 | 6/2003 | Scholl et al. |
| 6,606,766 | B2 | 8/2003 | Ko |
| 6,644,713 | B2 | 11/2003 | Del Pozo Abejon et al. |
| 6,715,375 | B2 | 4/2004 | Nestler |
| 6,729,357 | B2 | 5/2004 | Marsche |
| 6,732,638 | B1 | 5/2004 | Rometty et al. |
| 6,817,159 | B2 | 11/2004 | Sakaki et al. |
| 6,918,235 | B2 | 7/2005 | Nix |
| 7,011,000 | B2 | 3/2006 | Kushida et al. |
| 7,073,431 | B1 | 7/2006 | Chen |
| 7,249,862 | B2 | 7/2007 | Shirane |
| 7,312,609 | B2 | 12/2007 | Schmollngruber et al. |
| 7,456,608 | B2 | 11/2008 | Kageler et al. |
| 8,198,839 | B2 | 6/2012 | Katou et al. |
| 8,378,600 | B2 | 2/2013 | Katou et al. |
| 9,174,752 | B2 | 11/2015 | Neeser et al. |
| 9,193,486 | B2 | 11/2015 | Neeser et al. |
| 9,254,932 | B2 | 2/2016 | Neeser et al. |
| 9,284,080 | B2 | 3/2016 | Neeser et al. |
| 9,315,283 | B2 | 4/2016 | Neeser et al. |
| 2002/0100146 | A1 | 8/2002 | Ko |
| 2002/0129717 | A1 | 9/2002 | Helland et al. |
| 2002/0134811 | A1 | 9/2002 | Napier et al. |
| 2003/0145900 | A1 | 8/2003 | Jensen et al. |
| 2004/0206251 | A1 | 10/2004 | Nix |
| 2005/0279198 | A1 | 12/2005 | Kushida et al. |
| 2006/0108180 | A1 | 5/2006 | Grach et al. |
| 2006/0192527 | A1 | 8/2006 | Kageler et al. |
| 2009/0013656 | A1 | 1/2009 | Nasiatka et al. |
| 2009/0114308 | A1 | 5/2009 | Marelin et al. |
| 2011/0056392 | A1 | 3/2011 | Neeser et al. |
| 2011/0100233 | A1 | 5/2011 | Neeser et al. |
| 2011/0253480 | A1 | 10/2011 | Goodman et al. |
| 2012/0017780 | A1 | 1/2012 | Haberstroh et al. |
| 2012/0160364 | A1 | 6/2012 | Katou et al. |
| 2012/0210682 | A1 | 8/2012 | Gardner |
| 2013/0284033 | A1 * | 10/2013 | Bell, Jr. ................. B65B 13/22 100/32 |

FOREIGN PATENT DOCUMENTS

| | | | |
|---|---|---|---|
| CN | 1151129 | 6/1997 | |
| CN | 2266566 | 11/1997 | |
| CN | 1203878 | 1/1999 | |
| CN | 1253099 | 5/2000 | |
| CN | 1418163 | 5/2003 | |
| CN | 1558842 | 12/2004 | |
| CN | 1660675 | 8/2005 | |
| CN | 1859999 | 11/2006 | |
| CN | 101134308 | 3/2008 | |
| CN | 101164416 | 4/2008 | |
| CN | 101287578 | 10/2008 | |
| CN | 101486329 | 7/2009 | |
| CN | 201411061 | 2/2010 | |
| CN | 101678903 | 3/2010 | |
| CN | 101870367 | 10/2010 | |
| CN | 102026873 | 4/2011 | |
| CN | 102026874 | 4/2011 | |
| CN | 102026875 | 4/2011 | |
| CN | 202100012 | 1/2012 | |
| DE | 2818325 A1 * | 11/1979 | ............ B65B 13/04 |
| DE | 39 16 355 | 12/1989 | |
| DE | 40 14 305 | 11/1991 | |
| DE | 19751861 | 1/1999 | |
| DE | 10026200 | 11/2001 | |
| DE | 20321137 | 1/2006 | |
| DE | 10 2005 049130 | 4/2007 | |
| DE | 10 2006 007990 | 8/2007 | |
| DE | 10 2009 047443 | 6/2011 | |
| DE | 202011050797 | 11/2011 | |
| EP | 0095643 | 12/1983 | |
| EP | 0480627 | 4/1992 | |
| EP | 0603868 | 6/1994 | |
| EP | 0659525 | 6/1995 | |
| EP | 0744343 | 11/1996 | |
| EP | 0949146 | 10/1999 | |
| EP | 0997377 | 5/2000 | |
| EP | 0999133 | 5/2000 | |
| EP | 1177978 | 2/2002 | |
| EP | 1316506 | 6/2003 | |
| EP | 1413519 | 4/2004 | |
| EP | 2271553 | 4/2013 | |
| GB | 1 161 827 | 8/1969 | |
| GB | 2 041 869 | 9/1980 | |
| GB | 2 481 724 | 1/2012 | |
| JP | S5290398 | 7/1977 | |
| JP | S541238 | 1/1979 | |
| JP | S6322320 | 1/1988 | |
| JP | H05198241 | 8/1993 | |
| JP | H07300108 | 11/1995 | |
| JP | H08258808 | 10/1996 | |
| JP | H08324506 | 12/1996 | |
| JP | H09283103 | 10/1997 | |
| JP | 3044132 | 5/2000 | |
| JP | 2000128113 | 5/2000 | |
| JP | 2000128115 | 5/2000 | |
| JP | 3227693 | 11/2001 | |
| JP | 3242081 | 12/2001 | |
| JP | 2002235830 | 8/2002 | |
| JP | 2003170906 | 6/2003 | |
| JP | 2003231291 | 8/2003 | |
| JP | 2003348899 | 12/2003 | |
| JP | 2004108593 | 4/2004 | |
| JP | 3548622 | 7/2004 | |
| JP | 2004241150 | 8/2004 | |
| JP | 2004323111 | 11/2004 | |
| JP | 2007276042 | 10/2007 | |
| JP | 4406016 | 1/2010 | |
| KR | 840002211 | 12/1984 | |
| KR | 20000029337 | 5/2000 | |
| RU | 1772784 | 10/1992 | |
| RU | 2118277 | 8/1998 | |

(56) References Cited

FOREIGN PATENT DOCUMENTS

| | | |
|---|---|---|
| RU | 2161773 | 1/2001 |
| RU | 2004115639 | 1/2006 |
| RU | 2355821 | 5/2009 |
| SU | 1134117 | 1/1985 |
| WO | WO 01/89929 | 11/2001 |
| WO | WO 2006/048738 | 5/2006 |
| WO | WO 2007/116914 | 10/2007 |
| WO | WO 2009/129633 | 10/2009 |
| WO | WO 2009/129636 | 10/2009 |

OTHER PUBLICATIONS

Brushless DC Motor Drives, By Ali Emandi, in Energy-Efficient Electrical Motors, 3rd ed., Aug. 2004, ¶. 270-272, CRC Press & Marcel Dekker.

Lithium ion technology: shaping power tool. By Bender, in Air conditioning, heating, and refrigeration news. vol. 228, Issue 14, p. 18 Jul. 31, 2006.

\* cited by examiner

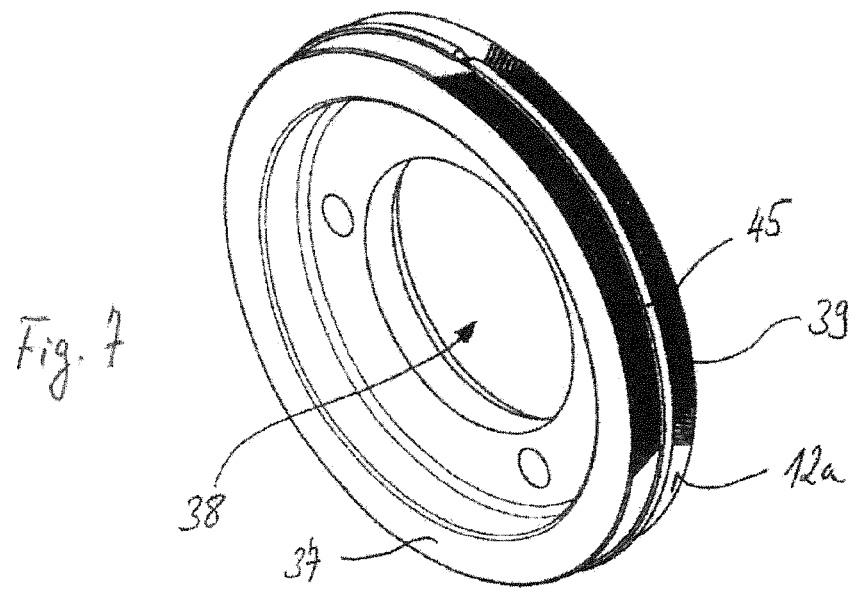
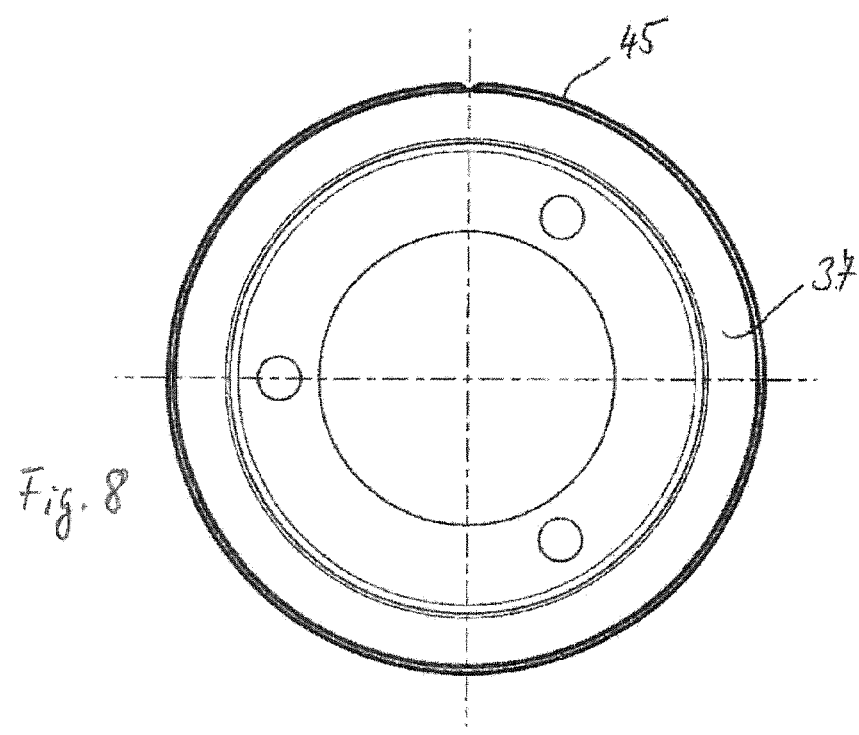
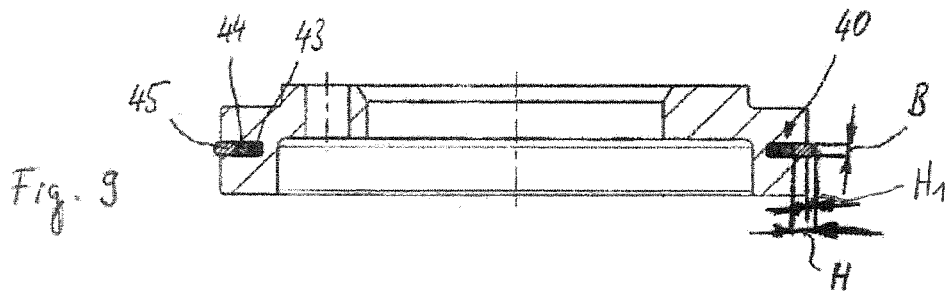

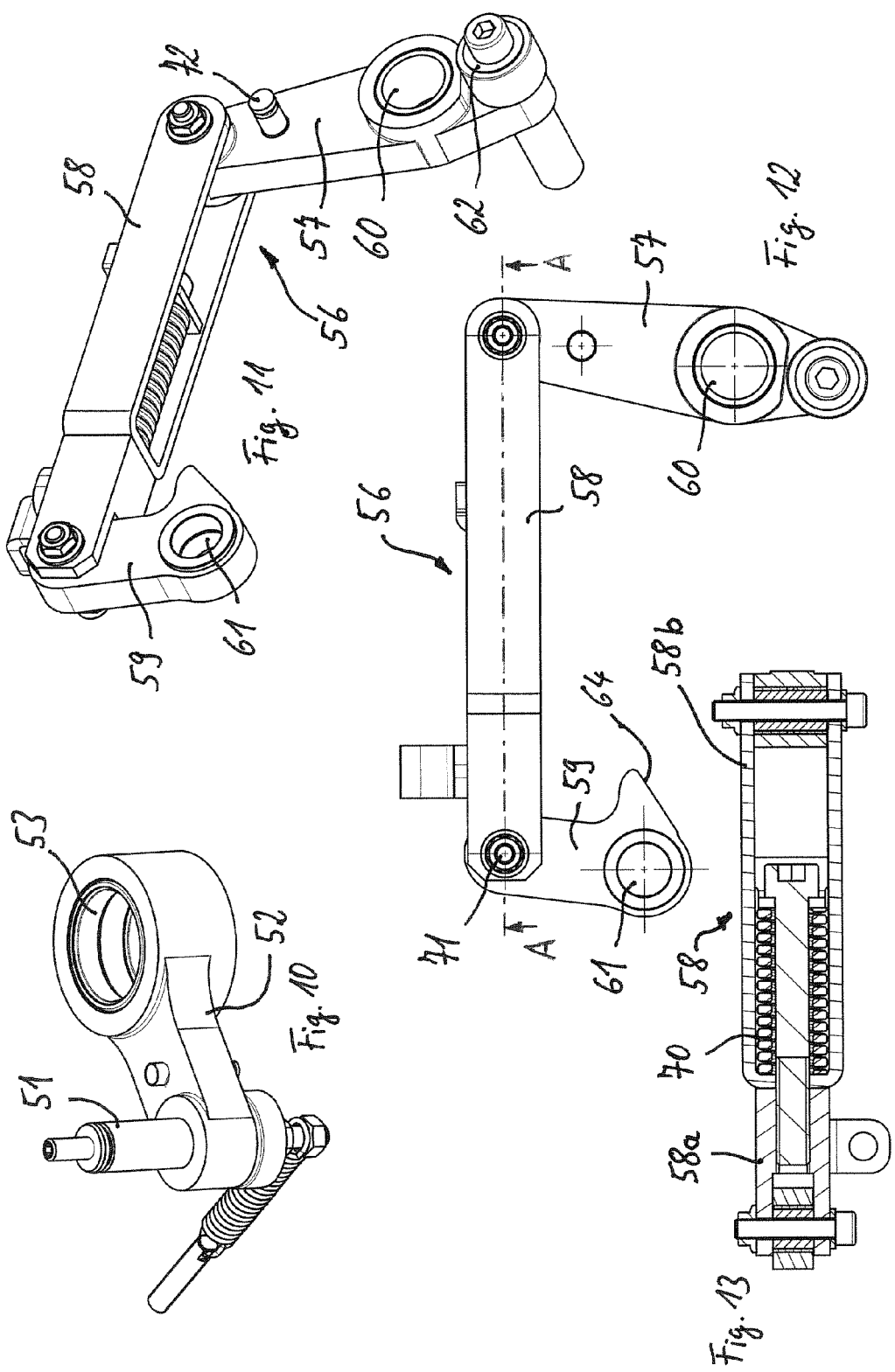

TENSIONING DEVICE FOR A STRAPPING DEVICE

This application is a national stage entry of PCT/CH2015/000013, filed on Feb. 10, 2015, which claims priority to and the benefit of Switzerland Patent Application Nos.: (1) 183/14, filed on Feb. 10, 2014; (2) 182/14, filed on Feb. 10, 2014; and (3) 181/14, filed on Feb. 10, 2014, the entire contents of each of which are incorporated herein by reference.

The present disclosure relates to a tensioning device of a strapping apparatus for the strapping of packaged articles with a strapping band, in particular with a plastics strapping band, which is equipped with a tensioning wheel which is operatively connected or operatively connectable to a drive device to set the tensioning wheel in a rotational movement about an axis of rotation, wherein the tensioning wheel has a circumferential surface which is designed for engaging into the strapping band. In the context of the present disclosure, the tensioning device may be provided both for static strapping apparatuses and for mobile, in particular portable, strapping apparatuses.

Strapping apparatuses of said type may be formed inter alia as a static installation which is utilized for equipping relatively large packaged articles, or multiple individual packaged articles placed together to form a packaged article unit, with one or more band straps. The band straps are normally formed from a band which is drawn from a supply roll and laid as a ring-shaped strap around the packaged article. For this purpose, the strapping band is shot with its free end first into a channel of the strapping apparatus, which channel surrounds the packaged article, with a spacing, in the manner of a portal or in ring-shaped fashion. Normally, as soon as the band end has reached a particular point in the channel, the band end is clamped and the band is then retracted again. As a result, the loop of the strapping band is tightened and the band passes out of the channel and into contact with the packaged article. Subsequently, a band tension is applied to the band, and the band ring is equipped with a fastening and is cut off from the supply roll. As strapping band, use is made both of metallic bands and of plastics bands. The strapping apparatuses are normally adapted to the strapping band types used therewith, in particular with regard to the connecting device by way of which two band layers, which lie one over the other in sections, of the strapping bands can be non-detachably connected to one another.

In the case of previously known solutions, during the retraction of the strapping band, the band of the loop is generally retracted at high speed in a direction opposite to the advancing direction in which the band was previously shot into the channel. It is normally also the case that the tensioning wheel of the tensioning device is arranged in said retraction path, by means of which tensioning wheel the tensioning process is only subsequently performed. Since the tensioning wheel is normally not driven, and is thus at a standstill, during the retraction process, there is the risk of the strapping band being guided or pulled over the tensioning wheel during the band retraction movement. As a result of the contact and the relative movement between the tensioning wheel and the strapping band, the strapping band can be damaged by the tensioning wheel. This risk is all the greater if the circumferential surface of the tensioning wheel is not smooth but is equipped with a geometrically defined or undefined roughened surface, such as for example a fluting, knurling or toothing, such as is common for improving the engagement conditions and for the avoidance of slip in the case of tensioning wheels. As a result of such damage to the strapping band generated by the tensioning wheel, the tensile strength of the strapping band can be reduced in the region of the damage, such that the band tears under the imparted tensile stress. Further disadvantages of such engagement can be seen in the friction-induced reduction of the band retraction speed and in the abrasion caused by the contact of the band with the rough surface of the tensioning wheel during the band retraction phase.

The present disclosure is therefore based on the object of improving a strapping device for strapping packaged articles with a strapping band such that disadvantages that arise as a result of the relative speed between the tensioning wheel and the band during the band retraction phase are as far as possible avoided.

Said object is achieved according to the present disclosure by way of a tensioning device of the type mentioned in the introduction in that, in the region of the circumferential surface of the tensioning wheel, there is provided on the tensioning wheel at least one movable spacer element which can be arranged in a first position and in a second position that differs from said first position, wherein, in the first position, the spacer element can be arranged at least in sections with a first spacing to the axis of rotation of the tensioning wheel and, in the second position, can be arranged with a second spacing, at least in sections, to the axis of rotation of the tensioning wheel, the first spacing differs here from the second spacing, and the spacer element, in at least one of the two positions, projects beyond the circumferential surface of the tensioning wheel. In this context, the spacing to the axis of rotation may be understood to mean a spacing of a region of the respective spacer element, which region which is provided for contact with the strapping band at least in one of the two positions, to the axis of rotation. The present disclosure thus makes it possible, by way of the at least one spacer element which is movable relative to the tensioning wheel, for the strapping band to be prevented from coming into contact with the surface of the tensioning wheel when the spacer element assumes its position in which it projects at least in sections beyond the circumferential surface of the tensioning wheel.

In one embodiment of the present disclosure, it may be provided that, by way of a force externally applied to the spacer element of the tensioning wheel, the spacer element can be transferred at least in sections from the position with the relatively large radial spacing to the axis of rotation into the other position with the relatively small radial spacing to the axis of rotation. The expression "externally applicable" may in this case be understood in particular to mean that the force is applied by an element which does not belong to the tensioning wheel or to the spacer element itself, in particular by the strapping band. The spacer element may be in the form of a passive element with regard to its change in position or the change in its geometrical shape. Since it is thus the case in such embodiments of the present disclosure that there is no need for a drive of the tensioning wheel to be provided for the generation of the change in position or shape of the spacer element, the tensioning wheel can be of structurally simple form despite the realization of the function according to the present disclosure.

A structurally simple and nevertheless compact embodiment of the present disclosure may provide that the spacer element is arranged so as to be rotatable together with the tensioning wheel. The at least one spacer element may be movable relative to the tensioning wheel itself, wherein changes in position of the at least one spacer element can take place, and are possible, in particular during a rotation of the tensioning wheel.

It may be provided that the at least one spacer element assumes its first position during the band retraction phase, such that, during the band retraction phase, the strapping band is arranged against the at least one spacer element of the tensioning wheel and thus with a spacing to the circumferential surface of the tensioning wheel. The band is thus ideally prevented by the spacer element from coming into contact with the circumferential surface of the tensioning wheel during the band retraction phase. If such contact is not entirely avoidable, said contact should however at least be reduced to the greatest possible extent by the spacer element. For the tensioning phase or the tensioning process, it is by contrast possible, in certain embodiments of the present disclosure, for the at least one spacer element to be moved with at least one of its sections into the second position thereof in which, at those points of the circumferential surface at which the tensioning wheel is looped around by the strapping band, said at least one spacer element is arranged no higher than the same height as the circumferential surface, or is arranged lower than said circumferential surface. In this way, the spacer element leaves the circumferential surface free for the desired contact with the circumferential surface during the tensioning process.

The at least one spacer element may be arranged in different orientations relative to the circumferential surface. Here, an orientation of the spacer element is parallel to the circumferential direction of the tensioning wheel. In this way, it is possible, with particularly little outlay in terms of construction, for the function of the spacer element to be ensured along the entire circumference of the tensioning wheel.

As a spacer element, both passive and active spacer elements may be provided for the purposes of moving the at least one spacer element into its two positions. Active elements may be understood as elements which perform a change in position or shape automatically, for example elements which perform self-generating changes in position and/or shape of the spacer element through the use of hydraulic or pneumatic energy or the use of electrical or magnetic energy. By contrast, however, in certain embodiments passive spacer elements are preferred, that is to say spacer elements which have a change in position and/or shape externally forcibly imparted to them, without the spacer element itself contributing to this. A change in position or shape may be realized for example by way of a counterpart roller which imparts a pressure force in the direction of the tensioning wheel and presses the band against the spacer element. In the presence of a correspondingly high force coordinated with the characteristics of the spacer element, it is possible in this way for the region of the spacer element to be provided with a smaller spacing to the axis of rotation of the tensioning wheel than in the unloaded state. The change in spacing may be utilized to the effect that, in the region of the counterpart roller, the strapping band bears now not against the spacer element but against the circumferential surface of the tensioning wheel.

Certain embodiments of the present disclosure are in particular embodiments in which there is no need for control of the times at which changes in position of the spacer element are to be performed. One embodiment of a passive spacer element may therefore provide that the forces exerted by the band on the tensioning wheel and thus also on the spacer element are themselves utilized to perform a change in position. Here, a particularly advantageous embodiment may provide that the forces of different magnitude during the band retraction phase and the tensioning phase are utilized to determine whether a change in position and/or shape should be initiated. A switching process is not necessary for this purpose; the change in position and/or shape may be realized, and also reversed, automatically. For this purpose, the spacer element may be designed such that the force exerted by the band on the tensioning wheel during the band retraction phase is not sufficient to move the spacer element into its second position. The relatively higher forces that are exerted by the band on the tensioning wheel during the tensioning process are however suitable, by way of correspondingly suitable configuration of the spacer element, for moving said spacer element into its second position in which contact is then realized between the strapping band and the circumferential surface. In this embodiment, neither additional energy nor monitoring or control of the process are necessary. An embodiment of the present disclosure which is uncomplicated in terms of construction but which is nevertheless functionally reliable is thus realized.

One embodiment of the present disclosure may provide both a counterpart roller, which imparts force in the direction of the tensioning wheel, and the utilization of the band for generating the change in position. In this way, it is possible for the change in position and/or shape of the spacer element to be realized in a particularly functionally reliable manner. Here, it may be advantageous if, in particular at the start of the tensioning phase, the band is forced against the spacer element by way of a counterpart roller or some other suitable element and, in this way, the spacer element is, at least in the region of the counterpart roller, forced back such that the band comes into contact with the circumferential surface. In this way, the band enters into engagement with the tensioning wheel, whereby it is possible to commence with increasing the band tension. As a result of this, the band begins to lie against the spacer element over an at least substantially predetermined wrap angle corresponding to its provided band guidance around the tensioning wheel. By way of an increase of the band tension, it is then also possible for the pressure force to be increased to a magnitude sufficient to force the spacer element back in the region of contact with the band, in such a way that the band is, over its wrap angle on the tensioning wheel, in contact with the circumferential surface of said tensioning wheel. Here, it is particularly advantageous for the spacer element to be forced back to such an extent that the spacer element, at least over a part of the wrap angle (and in certain embodiments substantially over the entire wrap angle) does not project beyond the contact region of the circumferential surface with the band. It is thus possible for the tensioning wheel to remain in engagement by way of its non-smooth circumferential surface even in the presence of further increasing band tension, and the band tension can be increased up to an intended value.

In this context, the expression "do not project beyond the circumferential surface" can also be understood to encompass arrangements in which the spacer element projects only slightly beyond the circumferential surface, and the strapping band, for example owing to its elasticity and deformability, can come into contact with the circumferential surface despite said small projecting length.

In another embodiment of the present disclosure, the circumferential surface of the tensioning wheel may, at least over a part of the length of the circumference, be equipped with a groove in which, as a constituent part of the spacer element, there may be arranged a ring element which can be arranged at least in sections in different positions. Here, the ring element may advantageously be arranged in a first position, in which it is elevated at least in sections in relation to the circumferential surface, and in a second position, in which the ring element, at least in sections, does not project beyond the circumferential surface.

Basically, a multiplicity of different solutions is conceivable by way of which the spacer element, such as for example the ring element, prevents the strapping band from coming into contact with the surface, which is intentionally kept non-smooth, of the tensioning wheel. A particularly advantageous solution may provide that the ring element extends substantially over the entire circumference of the tensioning wheel and is arranged in a groove which extends over the circumference of the tensioning wheel. In an expedient refinement of the present disclosure, it may be possible for the ring element to be forced into the groove by the strapping band under pressure loading, such that, owing to the ring element being forced back in this way, it is the case along a wrap angle that the ring element no longer projects beyond the circumferential surface, and the strapping band can come into contact with the circumferential surface of the tensioning wheel. The ring element may be designed so as to be forced back into the groove in the described manner only under the action of a certain minimum force acting on the ring element. Said minimum force may be predetermined such that it is reached during the tensioning process but not during the band retraction process.

In a further particular advantageous embodiment, it is possible, through utilization of resilient elasticity, for the ring element, or other embodiments of the spacer element, to be restored immediately and automatically when correspondingly relieved of the band pressure after having previously been subjected to load. To achieve this, the ring element, or some other embodiment of the spacer element, may itself be of resiliently elastic form. In further embodiments, there may be provided, in addition to the possibly at least substantially rigid or not adequately elastic spacer element, at least one resiliently elastic element, such as for example one or more O-rings or other spring elements, which impart a returning action to the spacer element. Aside from a high level of functional reliability, these solutions also make it possible to avoid a supply of external energy.

Finally, in a further embodiment of the tensioning device, during the tensioning process, the tensioning wheel rotates and, in relation to a positionally static polar coordinate system of the tensioning wheel, the spacer element is forced into the groove at the at least substantially always identical circumferential section of the tensioning wheel, whereas, at the remaining circumferential section, against which the strapping band does not bear, the spacer element projects in relation to the circumferential surface.

The above-stated object is furthermore achieved by way of a strapping device which is equipped with one of the tensioning devices according to the present disclosure.

Another embodiment of the present disclosure—which may also be of independent significance independently of the number of wheels, rollers and motors used for the imparting of movements to the band and independently of the design of the tensioning wheel—may provide an actuable means by which at least one wheel of a wheel pair of the advancing device can be switched into a state in which the strapping band can be displaced between the wheel pair in a direction opposite to the band advancement movement, without a corresponding motor drive movement being transmitted to the strapping band. With the present disclosure, provision is thus made for the state of the wheel pair to be changed from a state in which the band is clamped between said wheels, which state permits in particular the advancement of the band, into a state in which the band can move through between the wheel pair regardless of a driven movement of a wheel of the wheel pair. According to the present disclosure, the clamping state between the wheel pair, which clamping state is provided for the transmission of a motor drive movement via one of the two wheels to the strapping band, is reduced at least to such an extent that slippage or an increased gap can form between the band and the wheel pair. If an enlarged gap between the circumferential surfaces of the wheels is generated in the event of the clamping action being eliminated, said gap should be larger than the band thickness. The clamping action may for example be reduced simply by virtue of a pressure force with which the two wheels are pressed against one another being reduced, for example by way of a variably adjustable magnitude of said pressure force. Such a reduction of the clamping action may alone be sufficient for a strapping band to be able to move between the wheel pairs of its own accord.

The possibility of movement of the strapping band between the wheels of the wheel pair may however alternatively also be realized by virtue of an operative connection between a driven wheel and its drive being eliminated, such that both wheels of the wheel pair are rotatable freely and without a holding torque of the drive device. Such an elimination of an operative connection may be performed for example by way of a switchable clutch in the drive train of the driven wheel. By way of said switchable clutch, it is also possible for the operative connection to be restored in order for a drive movement, in particular a band retraction movement, to subsequently be imparted by the driven roller to the strapping band again.

By way of free rotatability of the wheel pair, or at least slippage or an adequately large gap between the wheels, it is made possible for the strapping band, immediately after or even during the generation of the band loop, to discharge excess band length of the band loop through between the wheel pair, whereby it is sought to as far as possible prevent the formation of a convolution. An incipient excess band length in the strapping channel leads to buckling in the band loop and thus to compressive and/or bending stresses in the strapping band. Normal strapping bands exhibit a flexural rigidity which has the effect that such bands have the tendency to dissipate compressive and bending stresses by seeking to assume planar and rectilinearly running orientation. This is advantageously utilized by the present disclosure in that, through the creation of a possibility for movement of the band through between the wheel pair, excess band length can move in particular of its own accord out of the band channel again between the wheels owing to the self-relaxation of the band.

In another refinement of said further aspect of the present disclosure, a strapping device in the case of which an advancing movement of the band through the strapping device is provided for the formation of a band loop and, here, the band is clamped between a motor-driven roller and a counterpart roller, a clearance device can be provided. According to this aspect of the present disclosure, in the case of a strapping device, the clearance device may be provided for performing a clearance-generating process between the driven roller and its counterpart roller, by way of which a spacing between the driven roller and its counterpart roller is generated or enlarged and is subsequently reduced in size again. In this context, therefore, the expression "generating a clearance" may be understood to mean the generation of a spacing.

With this measure according to said further aspect of the present disclosure, it is possible in a particularly functionally reliable manner for the formation of a convolution in the band noose or loop, in particular in the region of a band drive device of the strapping device, such as has hitherto often arisen after the completion of the band advancement process in the case of a high band advancement speed and can lead to malfunctions of the strapping device, to be at least substantially avoided. Excess band can move in the direction of the band store again of its own accord through the gap, enlarged owing to the clearance-generating process, between the two rollers. Such a backward movement of a band section through the enlarged gap between the two rollers may take place automatically, in particular owing to the impetus or the kinetic energy present in the band owing to the band advancement that has previously taken place and the flexural rigidity of the band, without the need for a corresponding motor-generated drive movement to be imparted to the band in the same direction.

It is advantageously possible for the clearance-generating process between the two rollers to be eliminated again before the band retraction process effected by motor drive movement, and for the two rollers to be placed in contact with one another again. The clearance-generating process is thus performed at a time between the band advancement process and the band retraction process. A time overlap between the band advancement process and/or the band retraction process, on the one hand, and the clearance-generating process, on the other hand, is possible here but is not imperative.

In a further expedient embodiment of the present disclosure according to this aspect, the non-motor-driven counterpart roller may be arranged on a rotatable eccentric. Here, the clearance-generating device may act on the eccentric in order, by way of rotation of the eccentric and the eccentricity, to generate between the two rollers a gap which is greater than the band thickness. After the completion of the clearance-generating process, the eccentric can be rotated in the then opposite direction again, whereby the two rollers clamp the band between them again and a band retraction process can be performed by way of the two rollers. Said embodiment of the present disclosure has inter alia the advantage that a fast movement of the counterpart roller for the generation of a spacing to the driven roller, and an advancing movement toward the driven roller again, are possible by way of an eccentric with a relatively small structural space requirement. In other embodiments of the present disclosure, the spacing between the two rollers for the clearance-generating process may self-evidently also be realized in some other way, for example by way of a pivoting movement or a linear movement of at least one of the two rollers.

In a further expedient embodiment of the present disclosure, it may be provided that the clearance-generating movement is realized by way of a linearly movable driven element such as for example a stroke-performing piston. Such stroke-performing elements are available in a variety of forms and with different drive principles. With such stroke-performing elements, it is possible the drive movement to form particularly functionally reliable clearance-generating devices. Furthermore, with such drive elements, it is also possible with relatively little outlay for existing strapping apparatuses to be retrofitted with a clearance-generating device.

Further embodiments of the present disclosure will emerge from the claims, from the description and from the drawing. The content of disclosure of the patent claims is hereby incorporated by reference into the description. The present disclosure will be discussed in more detail below on the basis of exemplary embodiments which are illustrated purely schematically in the figures.

FIG. 7 is a perspective illustration of a tensioning wheel according to the present disclosure with a partial illustration of the knurling of the circumferential surface of the tensioning wheel.

FIG. 8 shows a front view of the tensioning wheel from FIG. 7.

FIG. 9 is a cross-sectional illustration of the tensioning wheel along a diameter line.

FIG. 10 shows a component of a lever mechanism for a counterpart roller of the band drive device.

FIG. 11 shows a further component of the lever mechanism of the counterpart roller in a perspective illustration.

FIG. 12 shows the component from FIG. 11 in a front view.

FIG. 13 is a sectional illustration of the component from FIGS. 11 and 12.

Figure 1:
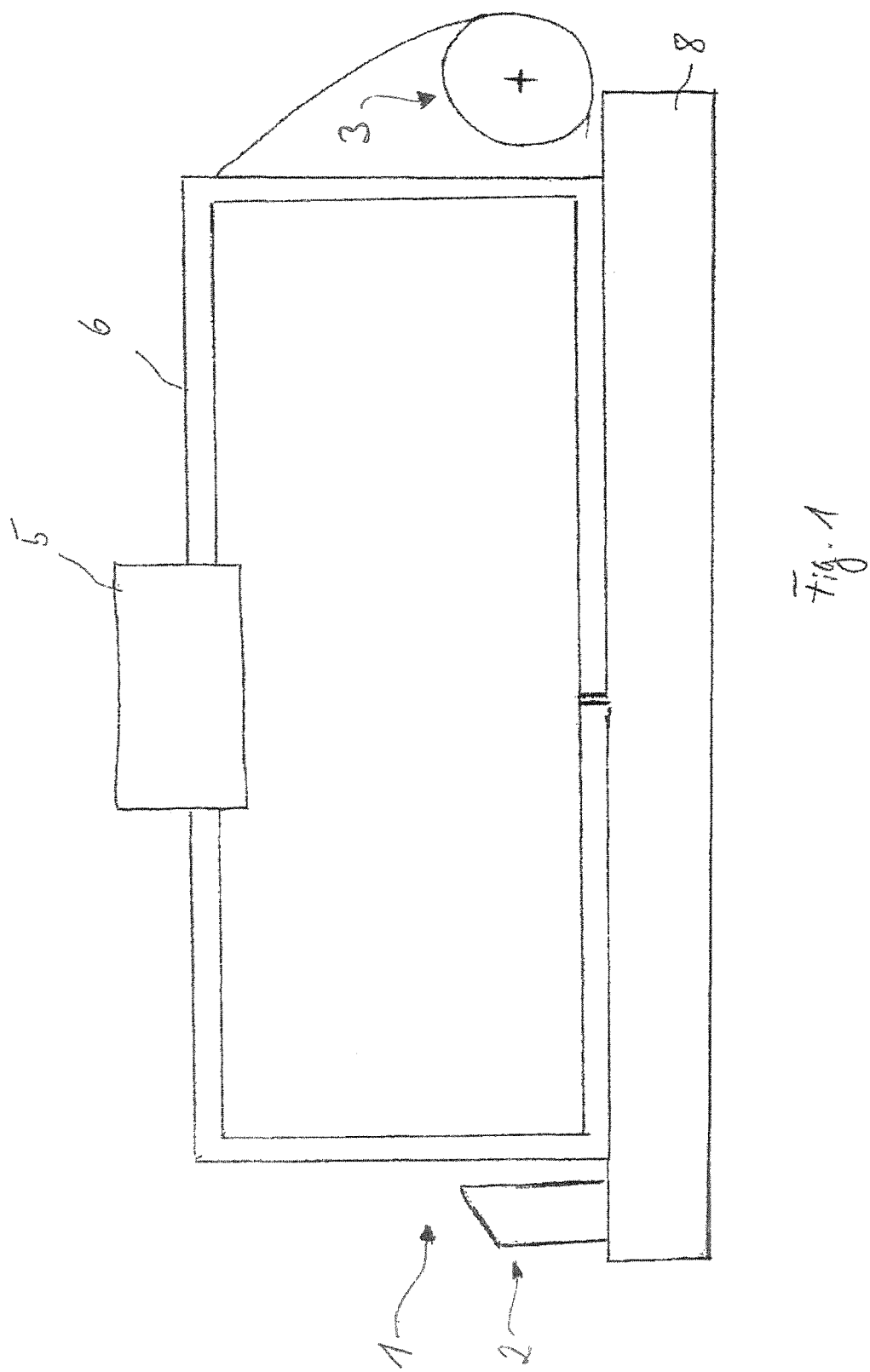
FIG. 1 is a highly schematized illustration of a strapping apparatus according to the present disclosure which is equipped with a strapping head according to the present disclosure.

FIG. 1 shows a strapping apparatus 1 which is equipped with a controller 2, a supply device 3 for storing and making available a strapping band, and with a strapping head 5. The strapping head 5 serves inter alia for the generation of an advancement movement and for the generation of a retraction movement of the strapping band. Said strapping head is furthermore equipped with a tensioning device, for imparting a band tension to a band loop, and a fastening device for generating a fastening on the strapping band. Furthermore, the strapping apparatus has a band guide 6 by way of which the band can be mechanically and automatically laid around a packaged item 7 on a predefined path. A welding and clamping unit 16 is also integrated into the strapping head 5. Aside from the strapping head 5, these are components that are known per se of strapping apparatuses.

Figure 2:
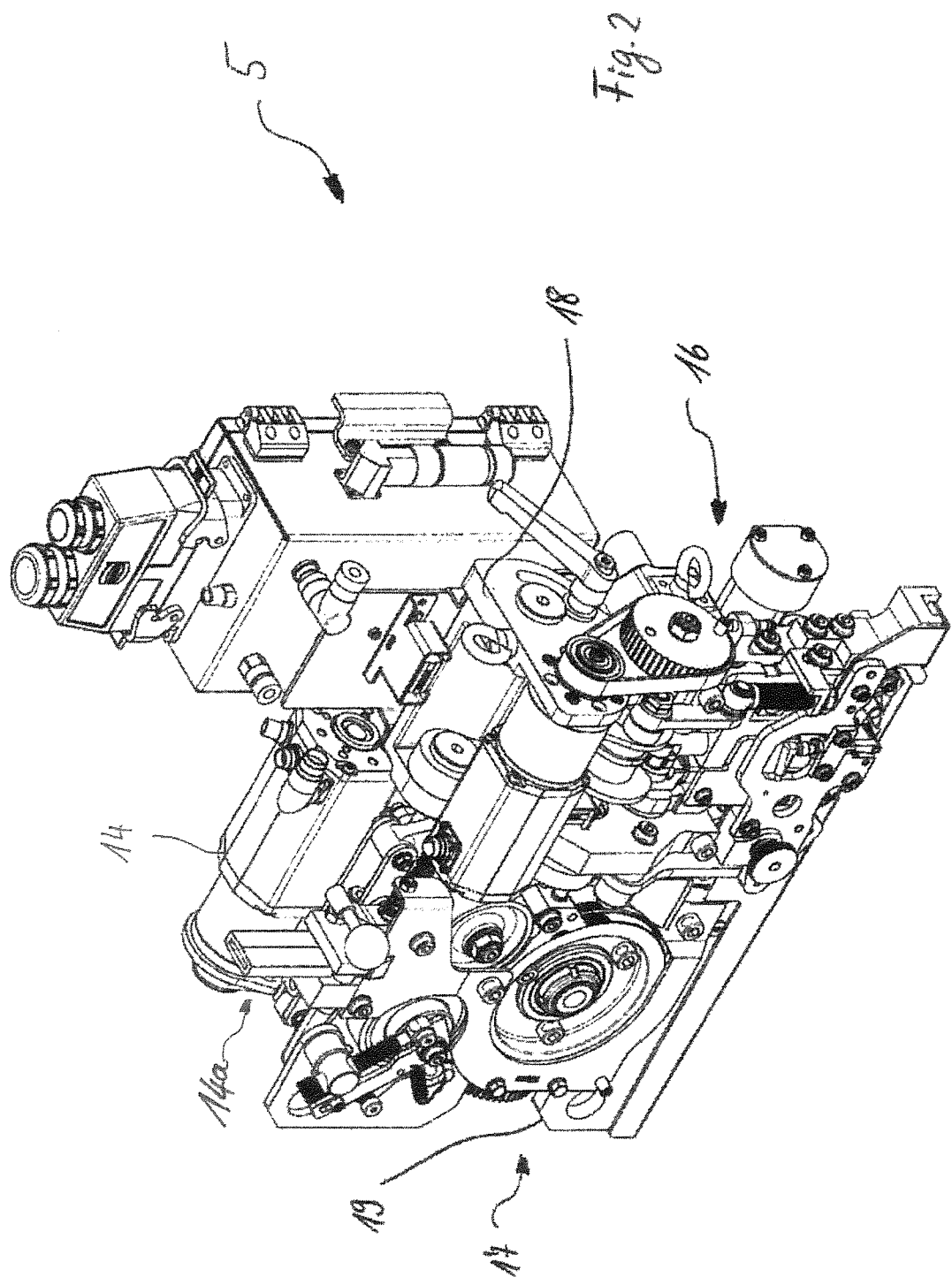
FIG. 2 is a perspective illustration of a strapping head according to the present disclosure.
Figure 3:
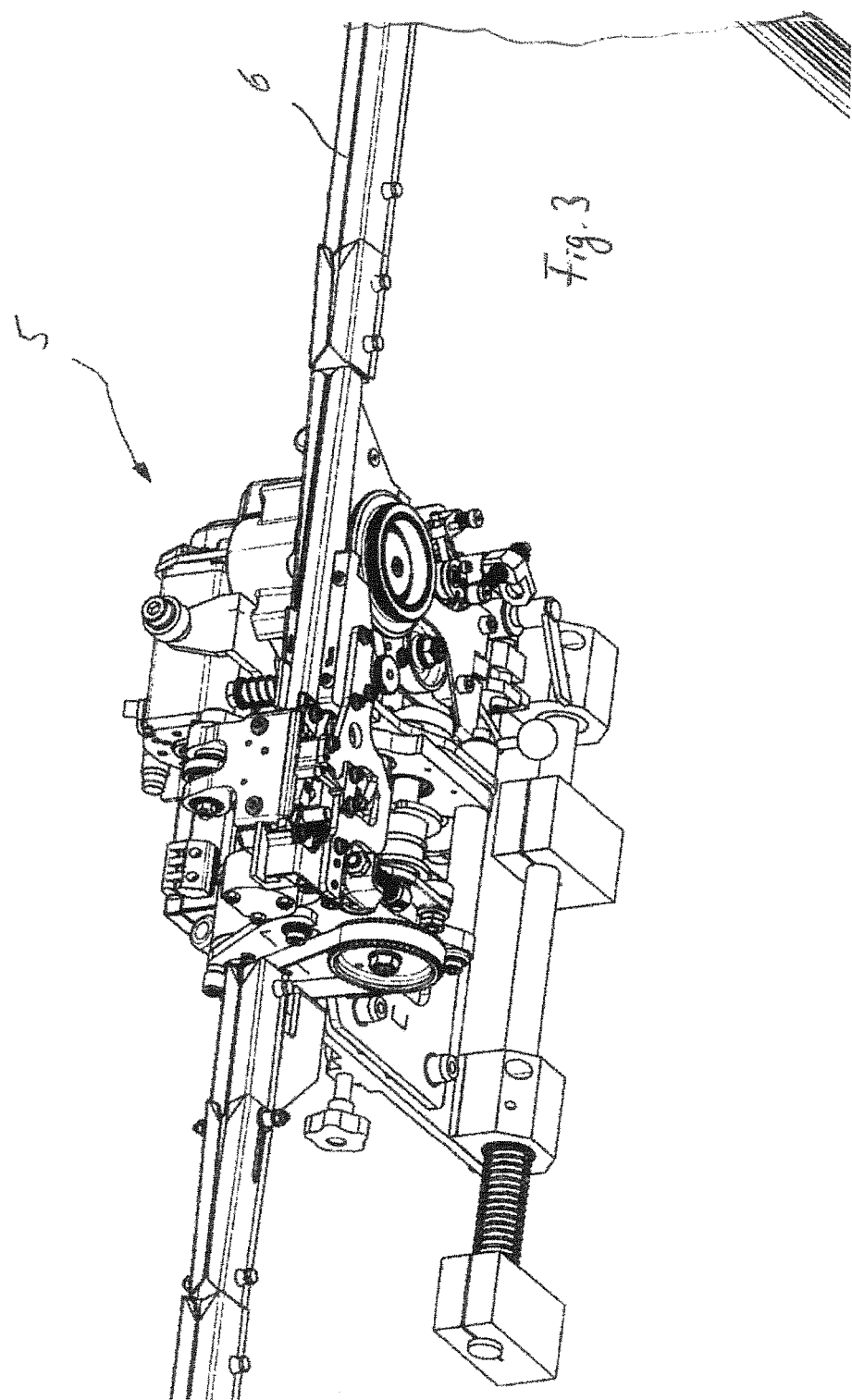
FIG. 3 is a perspective illustration from above of the strapping head from FIG. 2 integrated into a band guide of a strapping apparatus.

The strapping head 5, which is arranged together with the band guide 6 on a frame 8 and which is separately illustrated in FIG. 2 has a band drive device 15. Band drive devices are basically already known, for which reason substantially the differences in relation to previously known band drive devices will be discussed below. The band drive device according to this exemplary embodiment may be equipped in particular with one or more roller pairs 11, 12; 13 and possibly with further individual diverting rollers. The latter however do not participate in the generation of the band movement and are provided only for determining the band running direction. Of the three rollers 11, 12, 13 in the exemplary embodiment which generate the band movements, at least one of the rollers 11, 12, 13 should be motor-driven for the purposes of generating a band advancement or band retraction movement. Here, in each case one roller 11, 12, 13 of the roller pairs formed from said rollers, between which roller pairs the strapping band is led through and in the process an advancement, retraction or tensioning movement, and possibly a tension-relieving movement, is transmitted to the band, should be driven.

Figure 4:
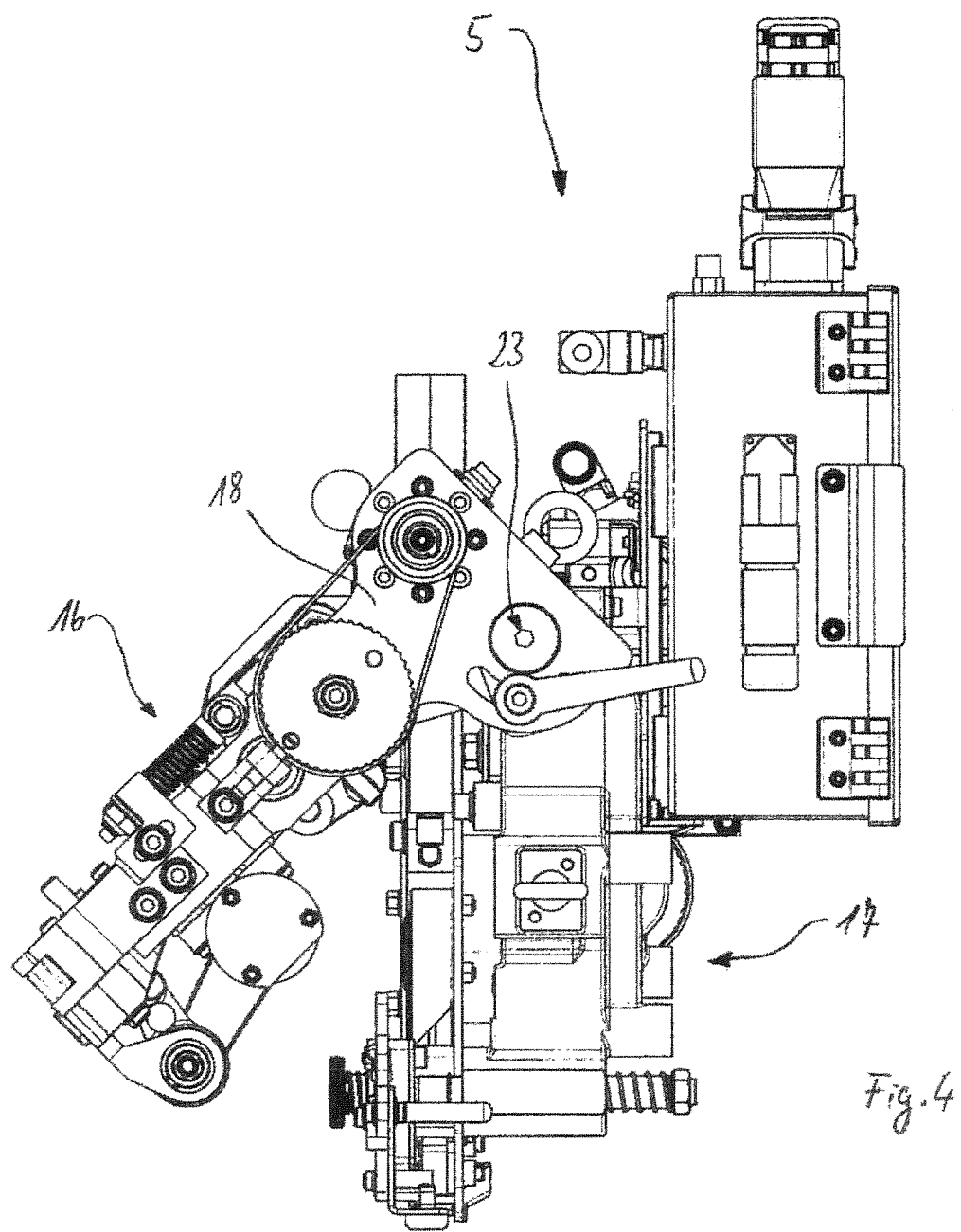
FIG. 4 shows a side view of the strapping head from FIG. 2, in the case of which a component is situated in a pivoted-out servicing position.

The strapping head 5 has two components: a control component 16 and a band handling component 17. In the exemplary embodiment, the control component 16, aside from the execution of control functions for the components of the strapping device, has further functions, for example the generation of fastenings between the two belt layers of a strap and the cutting of the strapping band from the band supply. The control component 16 is in this case mounted on a partial carrier 18 of the strapping head, wherein the partial carrier 18 is in turn detachably fastened to a common main carrier 19 of the strapping head 5. As can be seen in particular from FIG. 4, the partial carrier 18 of the control component 16 is pivotable about an axis 23. The elements of the band handling component 17 are fastened, without a dedicated partial carrier, directly to the main carrier 19 of the strapping head. In the exemplary embodiment, the control component 16 is provided substantially for performing control and coordination functions out of the functions performed by the strapping head. The band handling component 17 and the components attached thereto are, by contrast, provided for acting directly on the strapping band.

A band advancement device 20, a band retraction device 21 and a tensioning device 22 are integrated into the band handling component 17 of the strapping head 5. In the exemplary embodiment shown here, common rollers 11, 12; 13 are provided for the band advancement, band retraction and tensioning devices 20, 21, 22. Of the total of only three rollers 11, 12, 13, two rollers 11, 12 are motor-driven rollers. The two rollers 11, 12 are driven by the same (only one) motor 14, in the exemplary embodiment an electric motor. For this purpose, it may for example be provided that, from the common motor 14, in each case one drive train leads to one of the two rollers 11, 12. Here, the roller 11 is provided both as a drive wheel for the band advancement (band advancement wheel) and as a drive wheel for the band retraction (band retraction wheel). In order that, in the exemplary embodiment illustrated, said two functions can be performed by way of only one wheel, the roller 11 can be driven in both directions of rotation by the same drive motor 14. Here, in the illustration of FIG. 6, the direction of rotation counterclockwise is the band advancement direction, and the direction of rotation clockwise is the band retraction direction. As shown in FIG. 2, the motor drive movement is transmitted to both wheels or rollers 11, 12 by the common motor 14 by way of a mechanism device. In the present exemplary embodiment, the mechanism device 14*a* comprises a toothed-belt mechanism which transmits the drive movement from the motor shaft to a further shaft running parallel to the motor shaft. On said further shaft there are arranged two gearwheels which belong in each case to a further one of two partial mechanisms of the mechanism device. One of said two partial mechanisms of the mechanism device transmits the motor drive movement to the roller or the wheel 11, and the other partial mechanism transmits the motor drive movement to the tensioning wheel 12. Depending on the direction of rotation of the motor shaft, it is thus the case in the exemplary embodiment that both the tensioning wheel 12 and the wheel 11 rotate in different directions of rotation.

Figure 5:
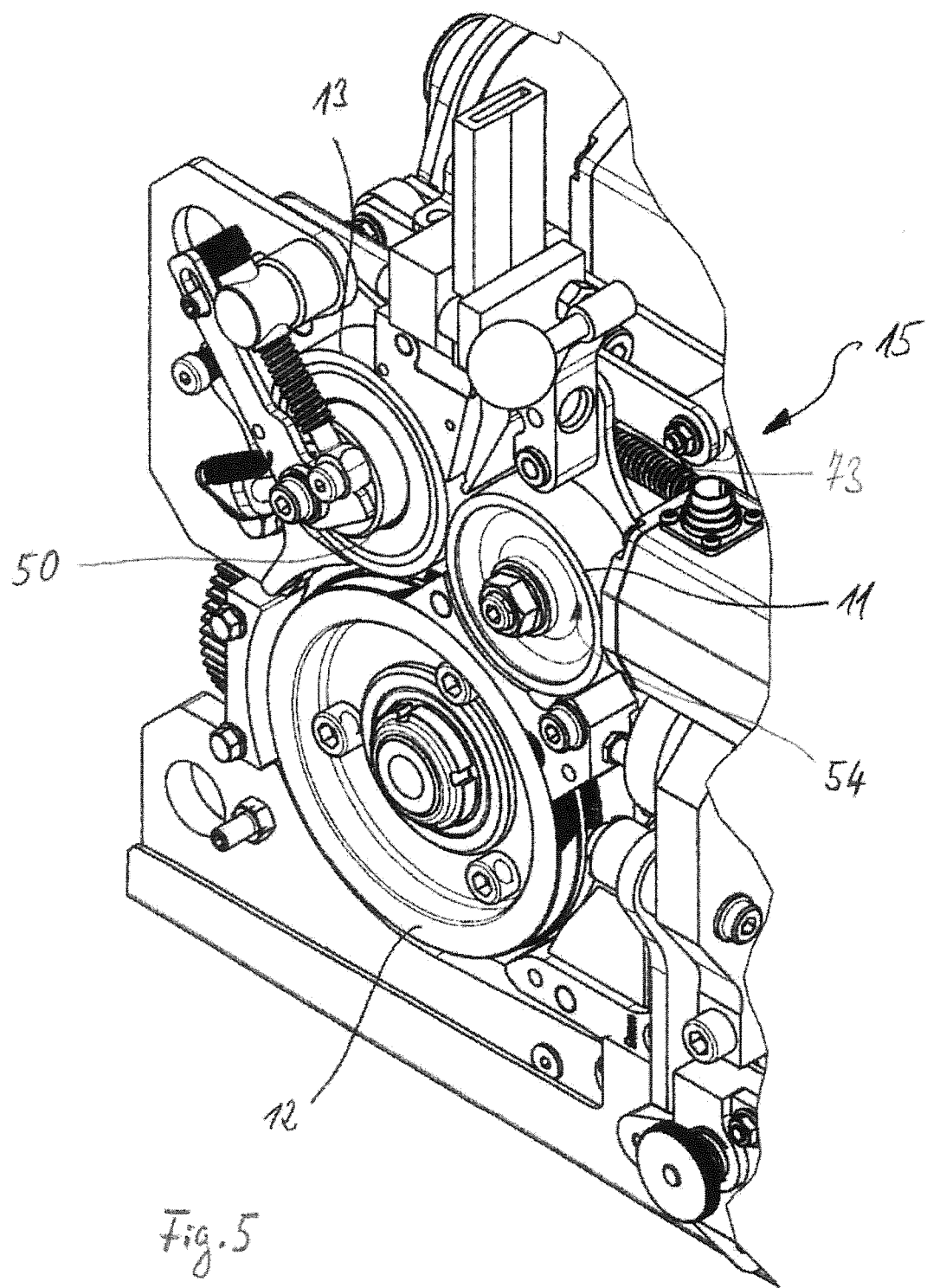
FIG. 5 is a perspective partial illustration of the strapping head from FIG. 2, with the band drive device being illustrated.
Figure 6:
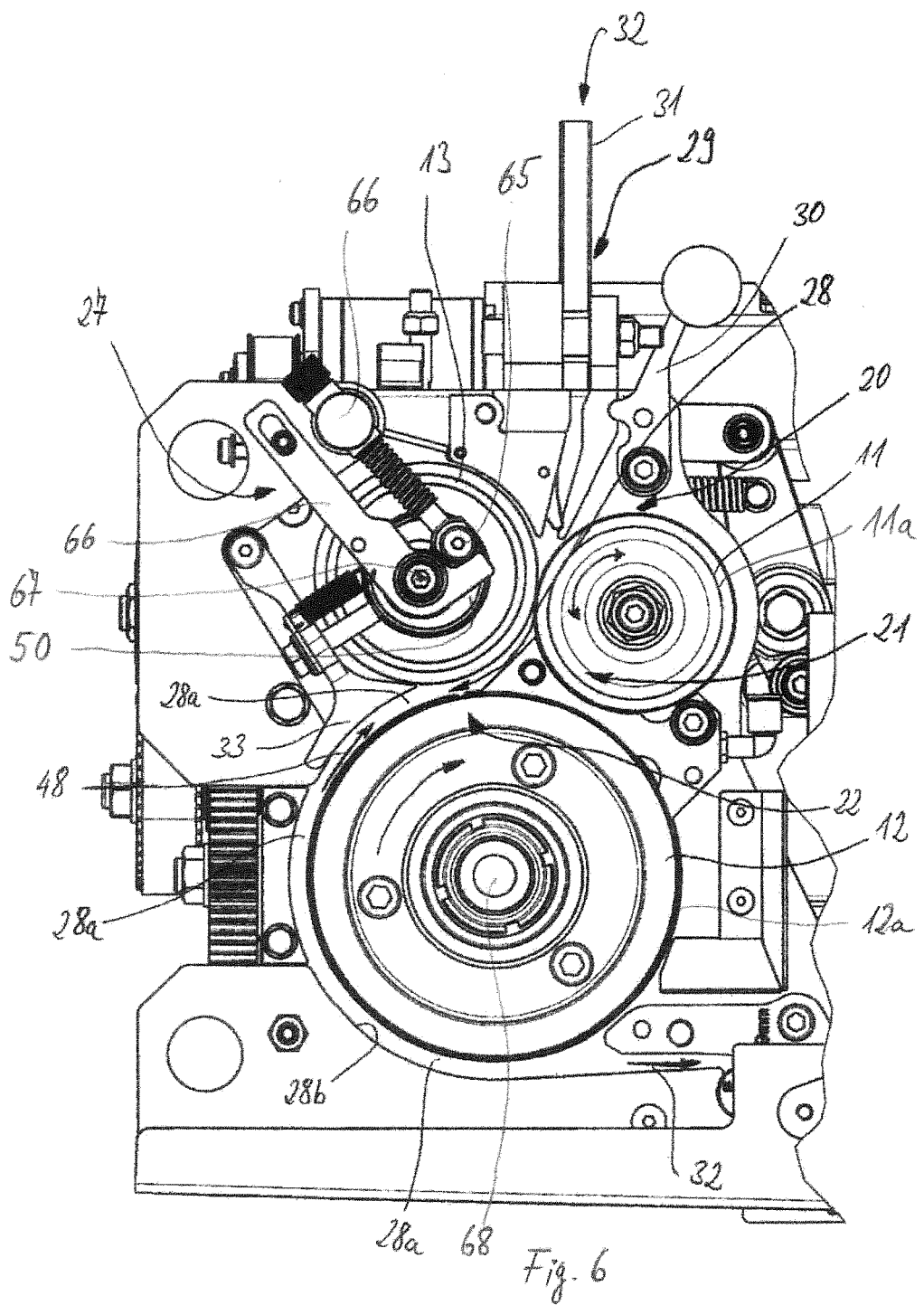
FIG. 6 shows a front view of the band drive device from FIG. 5.
Figure 14:
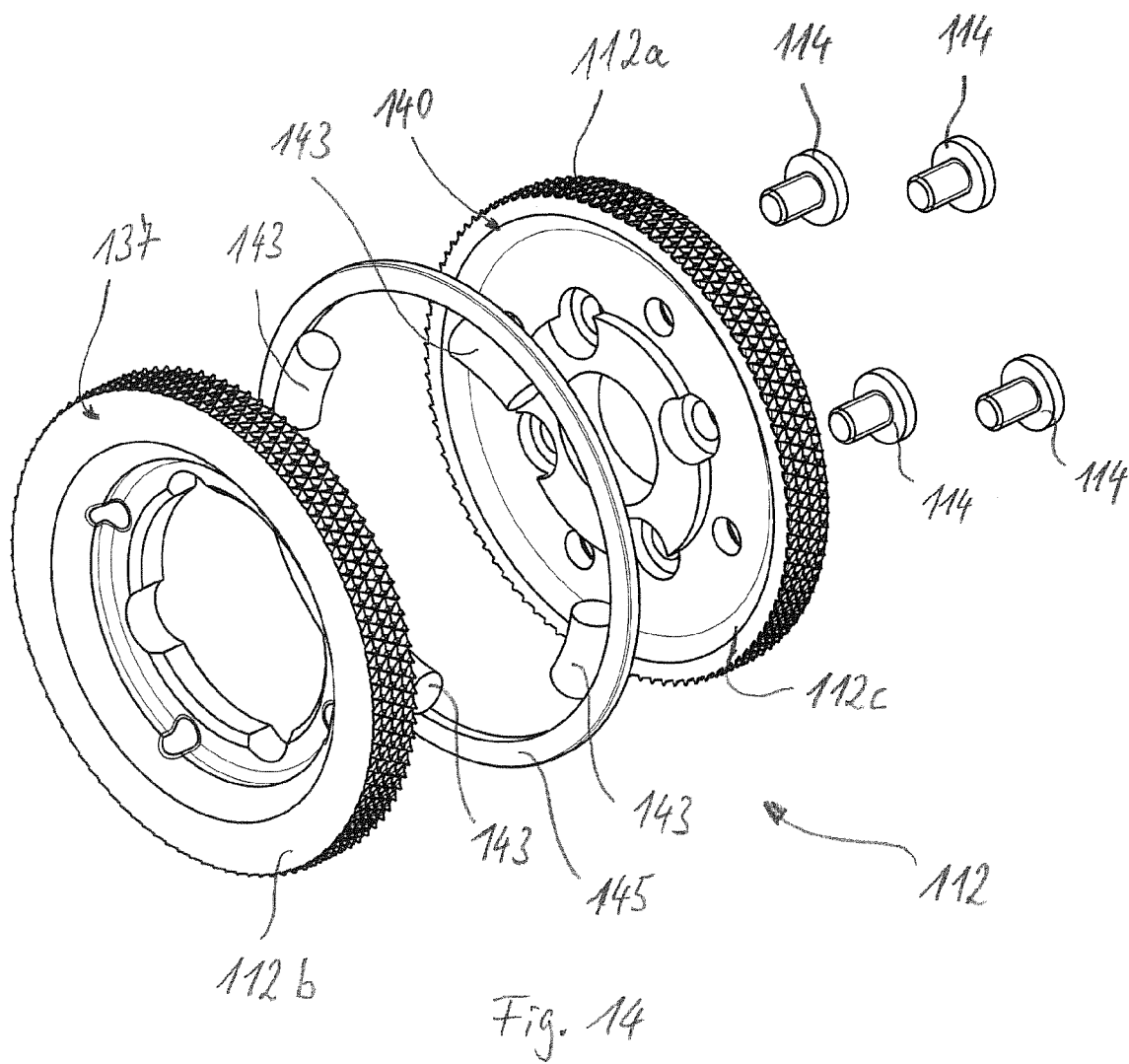
FIG. 14 is an exploded illustration of another exemplary embodiment of a tensioning wheel.
Figure 15:
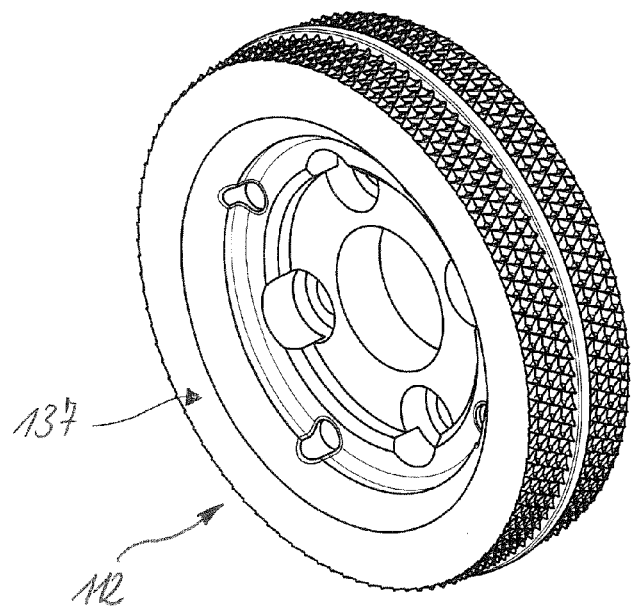
FIG. 15 is a perspective illustration of the tensioning wheel from FIG. 14.
Figure 16:
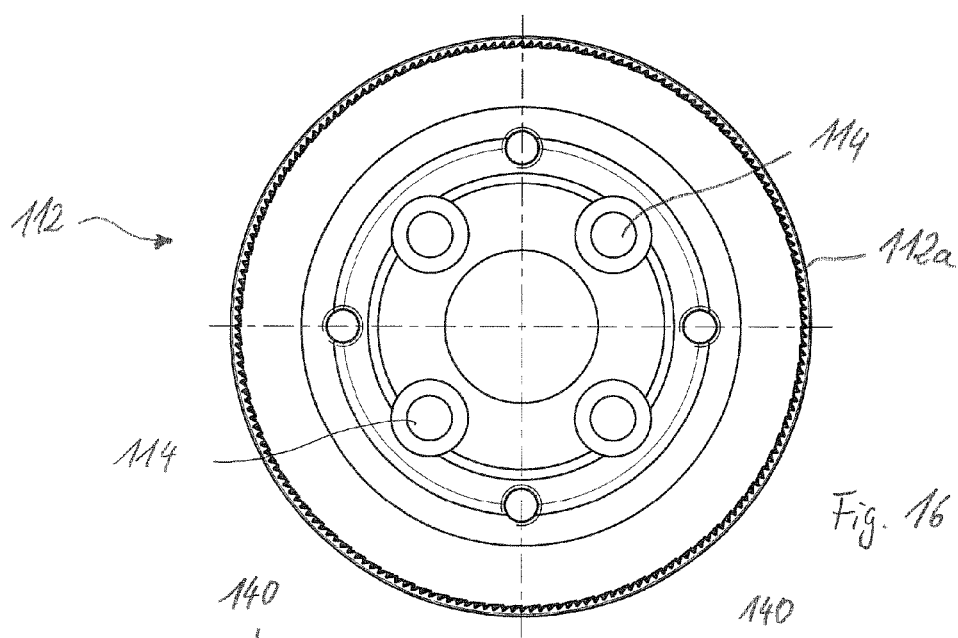
FIG. 16 shows a front view of the tensioning wheel from FIGS. 14 and 15.
Figure 17:
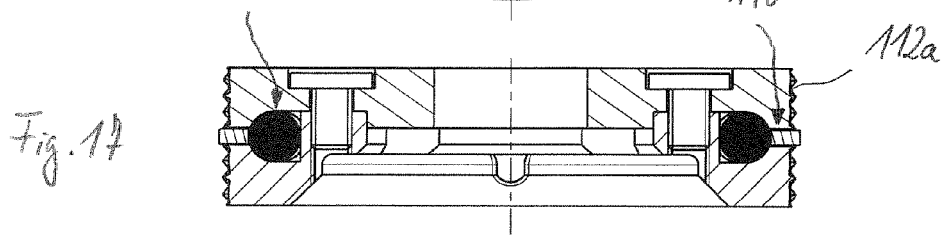
FIG. 17 is a sectional illustration of the tensioning wheel from FIGS. 14-16.

In the installed position of the strapping head depicted in FIGS. 5 and 6, the roller 11 is arranged above the roller 12. The roller 12 is a constituent part of the tensioning device 22 and has the function of the tensioning wheel. Said roller has a considerably greater diameter than the roller 11. The tensioning wheel 12, owing to the rigid connection to the motor 14 and the drive movements in both directions of rotation performed by the motor, can likewise be driven in both directions of rotation. For the imparting of the intended band tension to the strapping band, in particular to the band loop, the tensioning wheel however utilizes only the drive movement in the tensioning direction, that is to say the clockwise direction of rotation as viewed in the illustration of FIG. 6. In certain embodiments, a release of tension from the band section which is situated in the strapping head, and which is no longer part of the band loop, may be realized by way of a rotational movement of the tensioning wheel, taking place after the tensioning process, in the direction of rotation opposite to that during the tensioning process. The drive movements both for the tensioning movement and for the tension-relieving movement originate from the same drive motor as for the roller 11. As an alternative to the exemplary embodiment of the present disclosure illustrated here, it is possible in other embodiments for a switchable clutch to be provided in the drivetrain (not illustrated in any more detail) from the motor to the two rollers 11, 12, by way of which clutch the drive movement can be conducted either to the roller 11 or to the roller 12. Aside from embodiments in which the tensioning wheel is in turn capable of being driven in both directions of rotation, it may also be provided that the tensioning wheel can also be driven only in the direction of rotation provided for the tensioning process.

As can be seen from the illustration of FIG. 6, the roller 13 is adjacent both to the roller 11 and to the tensioning wheel 12. The roller 13 is not driven in rotation and is pivotably articulated by way of a pivoting device. The pivoting device is operatively connected to a drive by way of which the roller can perform (motor-) driven pivoting movements. By way of the pivoting movement, the roller 13 which functions as counterpart roller can be placed either in contact with the roller 11 or in contact with the tensioning wheel 12, wherein, in the respective end position of the pivotable roller 13, the strapping band is situated in each case between one of the rollers 11, 12 and the roller 13. Depending on which of the rollers 11, 12 the counterpart roller 13 bears against, the counterpart roller 13 then forces the band against the corresponding roller 11, 12 such that the corresponding roller 11, 12 can transmit its rotational movement with the least possible slippage as an advancement, retraction or tensioning movement, and possibly as a tension-relieving movement, to the strapping band. The counterpart roller 13 is thus, together with the roller 11, both a constituent part of the band advancement device and a constituent part of the band retraction device. Together with the tensioning wheel 12, the counterpart roller 13 is also a constituent part of the tensioning device 22. By way of this configuration according to the present disclosure, it is possible for the fourth roller that has hitherto been conventional in previously known solutions to be dispensed with. In the case of said previously known solutions, the drive roller and the tensioning wheel are in each case fixedly assigned one of two counterpart rollers. The 3-roller solution according to the present disclosure can permit a considerably more compact embodiment in relation thereto.

The rollers 11, 12, 13 are, in the strapping head 5, furthermore a constituent part of a band guide channel 28 which predefines the profile and the advancement and retraction path of the band. The band guide channel 28 is in turn part of the band guide 6. As can be seen in FIG. 6, the strapping head 5 has a first interface 29 at which the strapping head 5 adjoins the supply roll side of the band guide. That end of the band guide channel 28 which is formed here is in the form of a quick-change interface. This has a channel piece 31 which can be clamped to the strapping head by way of a pivotable clamping lever 30 and through which the band is supplied into the strapping head. The channel piece 31 ends directly in front of the circumferential surface 11a of the roller 11, such that the strapping band can be supplied at least approximately tangentially to the circumferential surface 11a of the roller 11. If the roller 13 is situated in its end position in which it is pivoted toward the roller 11, the band is led through between the rollers 11, 13, wherein the roller 13 forces the band against the roller 11.

As viewed in the band advancement direction 32, the band passes, in its further progression, to the tensioning wheel 12. Here, proceeding from the counterpart roller 13, a circular-arc-shaped channel section 28a which extends over approximately 180° of the circumference of the tensioning wheel 12 is formed by way of suitable channel-forming means. With regard to the band thickness, the channel section 28a is formed so as to be considerably wider than the band thickness. The inner delimitation of the channel section is formed by that section of the circumferential surface 12a of the tensioning wheel 12 which is situated in each case in the region of the channel section. The outer delimitation of the channel section 28a as viewed radially has guide plates and an outer channel segment which is pivotable together with the counterpart roller 13, by way of which outer channel segment the outer channel section can be kept closed despite the pivotable counterpart roller 13 being situated in the region of the outer channel section. Without the pivotable channel segment 33 or some other element of similar action, there would possibly be an open point of the channel section at least in one of the two pivoting end positions of the counterpart roller 13, which open point could possibly have an adverse effect with regard to reliable band guidance.

FIGS. 7, 8 and 9 show the tensioning wheel in three illustrations. Said tensioning wheel has a ring 37 which is equipped with a recess 38 which is provided for the connection of the tensioning wheel 12 to a shaft of the drive, in particular to a shaft of a mechanism of the drive. FIG. 2 shows the tensioning wheel 12 mounted on the shaft. As can likewise be seen from FIG. 6, the circular tensioning wheel has a circumferential surface 12a with an at least substantially constant width. The tensioning wheel 12 is equipped, on its circumferential surface 12a, with a knurling or toothing 39 by way of which the engagement conditions of the tensioning wheel 12 on the strapping band are improved. Instead of a knurling or toothing 39, it would also be possible for any other geometrically defined or undefined roughening of the circumferential surface 12a of the tensioning wheel to be provided, by way of which possible slippage between the tensioning wheel and the strapping band during the tensioning process can be at least substantially prevented.

A groove 40 with a relatively small width is formed over the entire circumference of the circumferential surface 12a at least approximately centrally—in relation to the width of the tensioning wheel 12—and so as to be spaced apart from the lateral edges of the tensioning wheel, which groove is formed so as to be considerably deeper than it is wide. In the exemplary embodiment, two resiliently elastic O-rings 43, 44 are situated one above the other in the groove 40, said O-rings being arranged radially one behind the other in the groove 40. Here, one of the O-rings 43 is arranged with a relatively small spacing to the axis of rotation of the tensioning wheel 12, and the other O-ring 44 is arranged with a relatively large spacing to the axis of rotation of the tensioning wheel 12. The width of the O-rings 43, 44 is in this case provided so as to approximately correspond to the width of the groove 40. The two O-rings 43, 44 are situated entirely within the groove 40. The two O-rings 43, 44 are formed from resiliently elastic material.

On the outer of the two O-rings 43, 44 there is seated a ring 45 which is provided as a spacer element and which, in the exemplary embodiment, is formed from a metallic material. In this exemplary embodiment, the ring 45 is elastically deformable. It would likewise be possible for the ring to be of substantially rigid or dimensionally stable form. To realize said elastic characteristics of the ring, it would also be possible for the ring 45 to be formed from one or more materials other than a metallic material, for example from an elastic plastic. In the exemplary embodiment, said metal ring 45 is, in terms of its cross section, provided so as to have a width B smaller than its height H. The height of the O-ring is, with regard to the groove depth and the height of the O-rings, configured such that the ring projects with a height $H_1$ out of the groove 40. Thus, in its unloaded state shown in FIG. 9, the ring 45 projects beyond the circumferential surface 12a of the tensioning ring 12, in particular over its entire circumference or over the entire circumference of the tensioning ring 12.

At the start of the strapping process, the strapping band is pushed at high speed, with its free band end first, from the strapping head 5 through the band guide 6. For this purpose, the counterpart roller 13 is in contact with one side of the band. The band is forced with its other side against the motor-driven roller 11 by the counterpart roller. The rotational drive movement of the roller 11 in the advancement direction is in this way transmitted to the strapping band, which effects the advancement movement thereof in the advancement direction. Downstream of the region in which the band emerges from the gap between roller 11 and counterpart roller 13, the band comes into contact with the tensioning wheel 12, but without exerting a significant pressure on the tensioning wheel 12.

After the band has been pushed all the way through the band guide 6, the band end reaches the closure head again. Here, the band end actuates a limit switch, whereby the advancement movement is stopped and the band end is clamped. These and other activation and deactivation processes of components of the closure head are performed by the control component 16 which, for this purpose, is equipped with a motor-driven camshaft control arrangement such as is basically known.

The camshaft control arrangement of the control component 16 now sets the roller 11 in motion in a direction of rotation reversed in relation to the advancement direction. The strapping band, which remains clamped between the roller 11 and the counterpart roller 13, is hereby moved in the reverse direction, that is to say in the band retraction direction 48. The circumferential length of the band loop, the band end of which remains clamped, is hereby continuously shortened. The band is hereby pulled out of the band guide 6 and, as a result, laid around the respective packaged item.

FIG. 6 illustrates the tensioning wheel 12 during the band retraction process. As can be seen from said illustration, it is the case during the band retraction process that the band comes into contact with the tensioning wheel 12. The strapping band bears against the tensioning wheel 12 substantially over the entire circular-arc-shaped channel section 28a, similarly to the situation also encountered during the subsequent tensioning process. The band is duly retracted here, but, owing to its ability to yield to said movement by moving, as intended, out of the band guide, it is nevertheless the case during said phase that only a relatively low band tension is applied to the band of the band loop. As a result of said contact with the tensioning wheel 12 and of the ring 45 which projects in relation to the circumferential surface, the band bears not against the circumferential surface of the tensioning wheel 12 but against the ring 45 situated in the circumferential surface 12a. Said contact with the spacer element, which, in the exemplary embodiment, is in this case in the form of a ring 45, has the effect that, during the band retraction, the band cannot be damaged by the knurling or toothing 39 of the circumferential surface 12a.

After the band has been laid against the packaged article as a result of the band retraction, the controller switches from band retraction to generation of a band tension, whereby it is the intention for the band laid against the packaged article to be pulled taut. For this purpose, it is firstly the case that the counterpart roller 13 is pivoted from its position of contact against the roller 11 into a position of contact against the tensioning wheel 12. The tensioning wheel 12, which is rotated in the same direction of rotation as the roller 11 was previously, rotates at a lower rotational speed but with a greater torque, and pulls further on the strapping band. Owing to the absence of pressure of the counterpart roller 13, it is by contrast now the case that the band no longer bears against the roller 11, which continues to be driven in the exemplary embodiment and which rotates at a higher speed, in such a way that the roller 11 could transmit its movement to the band. Since, at this stage, the strapping band already bears against the packaged article, the band is, by the tensioning wheel 12, retracted at most over a short length in relation to the band retraction phase. During said tensioning phase, it is in particular the case that a relatively high band tension is applied to the band.

Already at the start of the tensioning phase, the pressure of the counterpart roller 13 in the direction of the tensioning wheel and the band situated in between causes the ring 45 to be forced in the direction of the groove base and thus also in the direction of the axis of rotation of the tensioning wheel 12 as viewed in a substantially radial direction. In this way, it is the case already at the start of the tensioning phase that the band bears against the ring 45 and forces the latter likewise, at least in the region of the counterpart roller 13, in the direction of the groove base. Thus, already at the start of the tensioning process, the ring 45 has, in the region of the counterpart roller 13, a smaller spacing to the axis of rotation of the tensioning wheel than in its unloaded state, for example during the band advancement or the band retraction phase.

The torque transmitted from the tensioning wheel 12 to the band during the further course of the tensioning process, which torque is higher than that in the band retraction phase of the roller 11, results in a greater reaction force of the band. Said greater reaction force now has the effect that the band forces the ring 45 into the groove not only in the contact region with the counterpart roller 13 but over its contact length (wrap angle as viewed in the circumferential direction) with the ring 45, whereby the band now bears, along its wrap angle on the tensioning wheel 12, against the circumferential surface of said tensioning wheel. Along its wrap angle on the tensioning wheel, the band forces the ring into the groove counter to the spring forces of the O-rings. Depending on the characteristics of the ring 45, said ring is deformed possibly elastically as a result, and, along that circumferential section in which the strapping band does not bear against the tensioning wheel, said ring can partially (with regard to its height) emerge from the groove again. Outside the wrap angle of the band on the tensioning wheel, the ring 45 may in this case project out of the circumferential surface to a greater extent than in the unloaded state, in the case of which it projects with a height $H_1$. Since the ring is arranged rotationally conjointly in the groove, it is the case, in a manner dependent on the respective rotational position of the tensioning wheel 12, that each individual point of the ring is forced into the groove 40, and emerges from said groove again, in alternating fashion until, owing to the rotation of the tensioning wheel, said point arrives again at the point at which the band wraps around a section of the circumferential surface and thereby forces the ring into the groove along said section. It is thus possible, despite the means provided for preventing the strapping band from coming into contact with the circumferential surface of the tensioning wheel during the band retraction phase, for functionally reliable contact of the band with the same tensioning wheel to nevertheless be achieved during the band tensioning phase.

The counterpart roller 13 can advantageously be forced with different pressing forces firstly against the roller 11 (advancement roller or retraction roller) and secondly against the tensioning wheel 12 (during the use of the strapping device in each case with a strapping band situated in between). Higher pressing forces against the tensioning wheel than the possible pressing forces against the roller 11 can be advantageous for high functional reliability and for the possibility of applying high band tensions to the strapping band. Therefore, below, it will be discussed how, in one embodiment of the present disclosure, despite the pivoting movement of the counterpart roller 13 between two end positions, different pressing forces can be realized in the end position.

For this purpose, the counterpart roller 13 is arranged on an eccentric 50 which, in turn, is arranged on a shaft 51 of a carrier 52. The carrier has, spaced apart from the shaft 52, a receptacle 53 which is provided for arrangement on the bearing point 54 of the roller 11 (FIGS. 5 and 6). Here, the receptacle 53 is freely rotatable about its axis of rotation on the bearing point 54 of the roller 11 and can thus perform pivoting movements about its axis of rotation.

In the region of the counterpart roller 13 and of the roller 11, there is provided a parallelogram which has multiple levers 57, 58, 59 which are pivotably articulated on one another. The parallelogram 56 has a long vertical lever 57, a horizontal lever 58 and a short vertical lever 59. The parallelogram is pivotably articulated on the long vertical lever 57 and on the short vertical lever 59. The levers 57 and 59 have pivot bearing points 60, 61 for this purpose. Via a bell-shaped curve 62, it is possible for a rotational movement to be transmitted to the long vertical lever 57, which rotational movement leads to the pivoting movement of the lever 57 about its pivot bearing point 60. In the illustration of FIG. 12, the pivoting movement of the lever 57 takes place clockwise.

In this way, at the articulation point of the short vertical lever, the lever 58 also pulls said short vertical lever in the direction of the lever 57, whereby the vertical lever 59 is, in the illustration of FIGS. 11 and 12, likewise pivoted clockwise about its pivot bearing point 62. As a result, an oblique surface 64 formed on the short vertical lever 59 pushes against a bearing 51 arranged on the shaft 51. As a result, the oblique surface performs a movement clockwise (in the illustration of FIG. 12) and has the tendency to assume a horizontal orientation. As a result, the carrier 52 performs a pivoting movement, whereby the counterpart roller 13 is pivoted from its end position against the roller 11 in the direction of the tensioning wheel 12.

When it reaches the tensioning wheel, the counterpart roller bears against the tensioning wheel and can perform no further pivoting movement. The lever 57 however pivots further, whereby the bearing point 65 of the eccentric 50 is moved counterclockwise in the direction of an L-shaped carrier 66. After the bearing point 65 pushes against the L-shaped carrier 65, the movement of the bearing point 65 stops, and said bearing point is situated at least approximately in a line with an upper bearing point 66, the axis of rotation 67 of the counterpart roller 13 and the axis of rotation 68 of the tensioning wheel 12. A spring element that has hitherto generated the pressing force of the counterpart roller 13 is, as a result, no longer active.

A further movement of the lever 57 during its pivoting movement now has the effect that the lever 59 can also perform no further movement, and therefore two parts 58a and 58b of the horizontal lever 58 are pulled apart. A spring element 70 arranged between the two parts 58a, 58b of the lever is hereby compressed, whereby the spring force thereof increases. This leads to a torque of the lever 59 about the pivot bearing point 61 with the lever arm of the spacing of the pivot bearing point 61 from the articulation point 71 of the lever 58 on the lever 59. As a result, the oblique surface 64 pushes, in the form of a torque about the pivot bearing point 61, against the bearing, which now leads to a pressing force of the roller 13 against the tensioning wheel. By way of a correspondingly dimensioned and designed spring element 70 and corresponding lever ratios, it is possible in this way to realize high pressing forces of the roller 13 against the tensioning wheel.

A restoration of the parallelogram can be realized by way of a further spring 73 arranged on the peg 72 of the lever 5.

Alternative embodiments of components and assemblies discussed above will be described below. Here, substantially only differences in relation to the corresponding components from FIGS. 1 to 13 will be discussed. Where said embodiments include identical or similar configurations to those in the exemplary embodiment of FIGS. 1 to 13, these will not be discussed in any more detail below; the content of disclosure of the exemplary embodiments of FIGS. 1 to 13 is however also incorporated by reference for the exemplary embodiments of FIGS. 14 to 19.

FIGS. 14, 15, 16 and 17 illustrate a further embodiment of a tensioning wheel 112 according to the present disclosure. The tensioning wheel 112 may be divided longitudinally in terms of its width, approximately in the center, wherein the two parts 112b, 112c of the tensioning wheel 112 are detachably connectable to one another by way of suitable fastening elements, for example screws 114. In the region of said parting plane, which need not run in a flat manner, an encircling groove 140 is formed in the outer ring 137 of the tensioning wheel 112, which groove is open toward the circumferential surface 112a of the tensioning wheel 112 and is narrowed or decreased in size toward said circumferential surface.

One or more restoring elements may be arranged in the groove 140. In the exemplary embodiment, as a restoring element, there are arranged elastic ring sections 143, for example multiple resiliently elastic O-ring sections 143. Said ring sections are distributed in the groove 140 at regular intervals with respect to one another, as is the case in the exemplary embodiment with a total of four ring sections 143. The restoring elements 143 are situated below one or more spacer elements. In the exemplary embodiment, only one spacer element 145, in the form of a closed ring, is provided. An outer diameter of the ring 145 arranged in the groove is in this case dimensioned such that, in the unloaded state of the ring 145, said ring projects with its outer circumferential surface beyond the circumferential surface 112a of the tensioning ring 112. The ring 145 is situated with its inner circumferential surface in the groove. The restoring elements are attached to the inner circumferential surface of the circular and substantially dimensionally stable ring 145. In other embodiments, it is also possible for a different number of spacer elements, and a different number of restoring elements, to be provided.

As a result of contact of the strapping band against the ring 145, and as a result of a certain minimum pressure force being exerted on the ring along a certain angle range along a section of the circumference of the tensioning wheel by the strapping band, it is possible for approximately that section of the ring 145 which projects beyond the groove along said angle range to be forced into the groove 140, such that, in said positionally static angle range of the tensioning wheel 112, the strapping band comes into contact with the circumferential surface 112a of the tensioning wheel 112 and can be driven along by the circumferential surface 112a during the movement of the tensioning wheel 112. The ring 145, which substantially cannot be deformed by the expected forces acting thereon in the exemplary embodiment, and which is thus dimensionally stable, is thus arranged slightly eccentrically in relation to the axis of rotation of the tensioning wheel during said process. The ring 145 hereby projects, with its section not encompassed by the wrap angle of the band, out of the groove 140 further than when the tensioning wheel is in the state in which it is not subject to load by the strapping band. As a result of the ring 145 being relieved of the load of the strapping band, or when a pressure force exerted on the ring 145 by the strapping band is not sufficient, it is possible, after the completion of the tensioning process, for the elastic restoring forces of one or more of the ring sections 143 to cause the ring 145 to project out of the groove again over its entire circumference.

By way of this arrangement, it is possible, during the tensioning process, during which the tensioning band exerts an adequately high pressure force on the ring 145 situated in the wrap region of the strapping band, for the ring 145 to be forced in sections into the groove 140. During the retraction process, during which only a relatively low tensile stress is present in the strapping band, the pressure force on that section of the ring 145 which is presently arranged in the wrap region of the band is not high enough to force said ring section entirely into the groove 140. As a result, the band bears against the section of the ring 145 and not against the surface of the tensioning wheel 112. The ring 145 holds the strapping band so as to be spaced apart from the circumferential surface of the tensioning wheel 112.

Figure 18:
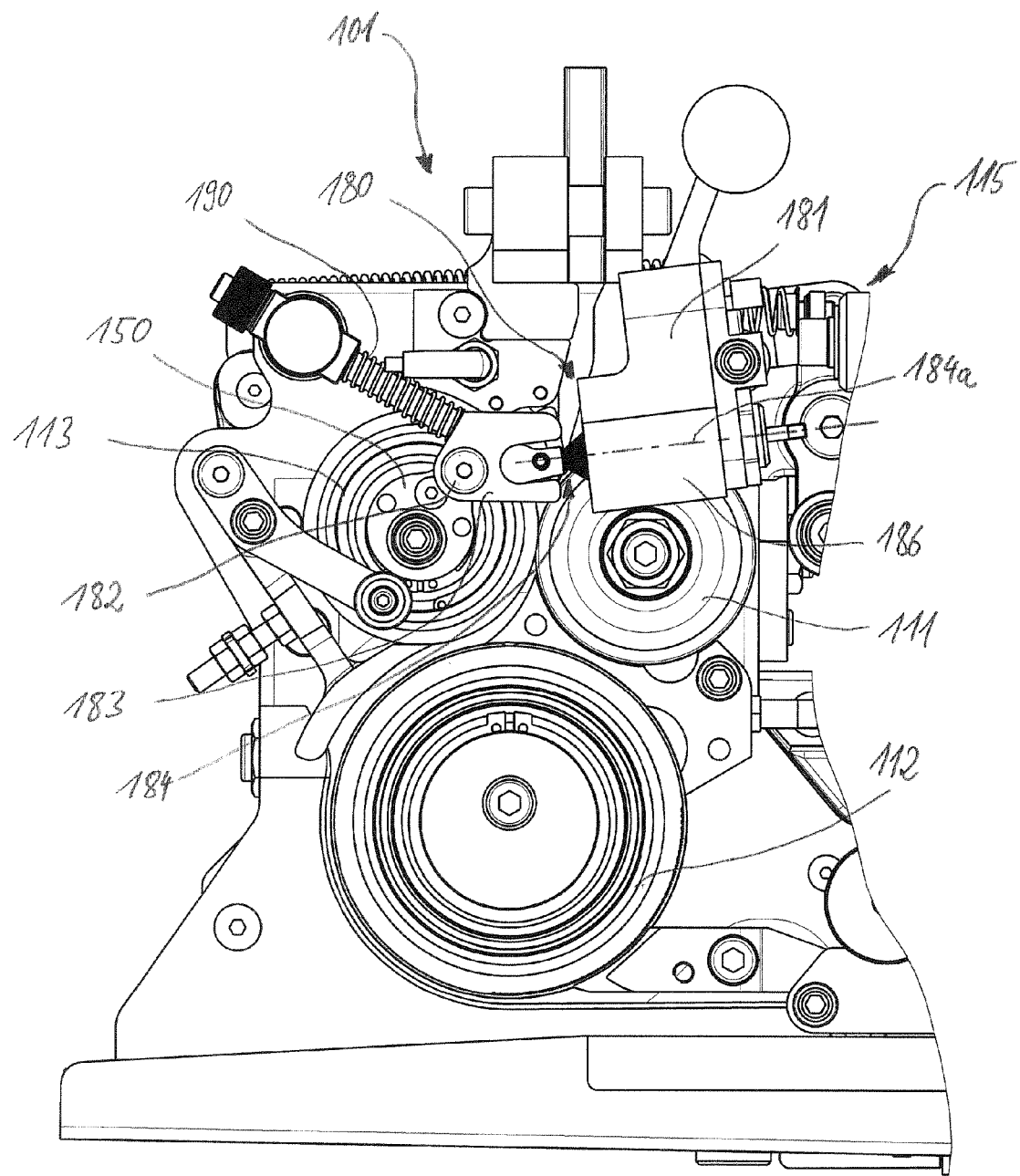
FIG. 18 shows a further exemplary embodiment of a band drive device according to the present disclosure with a clearance-generating device in a partial illustration of a strapping head.
Figure 19:
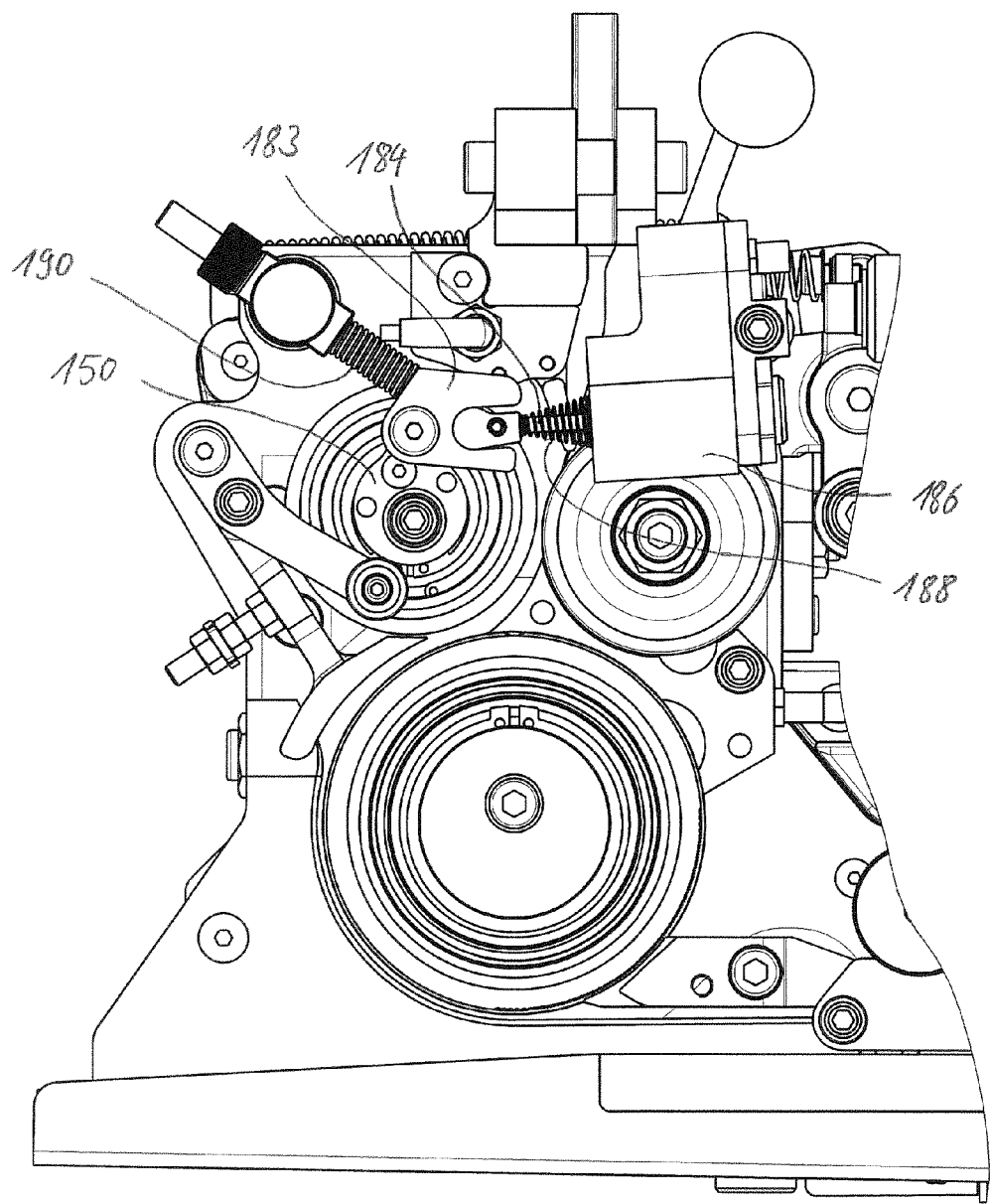
FIG. 19 shows the band drive device from FIG. 18 in an illustration in which a clearance has been generated between a counterpart roller and the driven roller that interacts therewith.

FIGS. 18 and 19 illustrate a further exemplary embodiment of a band drive device 115. Said band drive device also has only three rollers 111, 112, 113 which are responsible for imparting the band advancement, band retraction and band tensioning movements to the band by way of contact with the band, wherein the two rollers 111 and 112 can be driven by way of a motor, in particular by way of only one common motor. The relative arrangement of the axes of rotation of the three rollers 111, 112, 113 with respect to one another corresponds at least approximately to the arrangement of said axes of rotation in the exemplary embodiment of FIGS. 5 and 6.

The counterpart roller 113 is again designed to be pivotable, such that, in one pivoting position, it is provided for pressing the strapping band against the roller 111, and in another pivoting position, it is provided for pressing the strapping band against the tensioning roller 112. The pivoting mechanism, provided for this purpose, of the counterpart roller 113, and the drive of said pivoting mechanism, may in principle be of the same design as in the exemplary embodiment of FIGS. 1 to 13. As in the exemplary embodiment of FIGS. 5 and 6, the counterpart roller 113 is rotatably mounted on an eccentric 150, such that the counterpart roller 113 performs a non-circular-arc-shaped movement during a pivoting movement from one of the rollers 111, 112 to the respective other roller 111, 112. As shown in FIGS. 18 and 19, a clearance-generating device 180 is mounted on the eccentric 150 of the counterpart roller 113, wherein the clearance-generating device 180 is supported with a carrier 181 on the frame of the strapping apparatus 101. The bearing point 182 of the clearance-generating device on the eccentric 150 is itself arranged pivotably on the eccentric, and is in the form of a C-shaped or fork-shaped element 183 to thereby form a receptacle for one end of a piston 184. Said piston 184 is arranged in displaceable fashion in the carrier 181 of the clearance-generating device 180. In the illustration of FIGS. 18 and 19, the support point is situated immediately above the roller 111. The carrier 181 of the clearance-generating device is in this case likewise mounted in pivotable fashion.

In the exemplary embodiment shown, the clearance-generating device 180 is equipped with a clearance-generating element which is provided for performing a controlled movement by way of which the counterpart roller 113 is acted on in order for the counterpart roller 113, in its pivoted edition against the roller 111, to be moved such that a clearance is generated, or to be lifted slightly. The counterpart roller 113, in its pivoted position at the roller 111, should, even after the generation of a clearance, be able to be placed against the roller 111 again, for example likewise by way of the clearance-generating device. In the exemplary embodiment, the clearance-generating element is in the form of a solenoid 186 which is arranged and mounted on the clearance-generating device 180. The solenoid 186 can, by way of its piston 184, perform a linear stroke movement along the longitudinal axis 184a of its piston 184. As shown in FIGS. 18 and 19, one end of the piston 184 is arranged in the recess, which is open toward the carrier 181, of the C-shaped or fork-shaped element 183. The end of the piston 184 and the recess of the C-shaped element may in this case be designed such that, during the clearance-generating movement, the end of the piston 184 in the C-shaped element can move relative thereto.

Here, the extended longitudinal axis 184a of the piston 184 runs at least approximately through the articulation point of the C-shaped element 183. A stroke movement of the piston 184 in the direction of the counterpart roller 113 thus leads to a rotational movement of the eccentric about its axis of rotation. In the illustration of FIG. 18, the rotational movement takes place counterclockwise, as can be seen from a comparison of the two FIGS. 18 and 19. The rotational movement of the eccentric 150 in turn has the effect that the axis of rotation of the counterpart roller 113 is displaced in parallel and a gap, or an enlarged gap, is formed between the roller 111 and the counterpart roller 113. The width of the gap should in this case have a size greater than the thickness of the strapping band being processed in each case. As a solenoid, use may for example be made of the product GKb-32.06 from the company Isliker Magnete AG, CH-8450 Andelfingen.

On the piston 184 there may be arranged a mechanical spring element, in particular at least one compression spring 188. Said compression spring 188 is compressed, and thus braced in resiliently elastic fashion, during the movement of the counterpart roller 113 from the tensioning roller 112 into contact with the roller 111. The electrically actuable magnetic stroke-performing piston is deactivated, and thus has no action, in this phase. During the stroke movement, the compression spring 188 is at least partially relaxed and the spring force acts so as to assist the force imparted by the solenoid, by way of which force the piston 184 is moved so as to generate a clearance between the counterpart roller 113 and the roller 111. In other exemplary embodiments, in which the solenoid or some other restoring element alone provides a force high enough for the clearance-generating process.

During the production of the strap, it is the case—as already described—that, by way of the roller 111 and the counterpart roller 113 which bears against the former roller and clamps the band between the two rollers, the band is moved through the band guide channel 28 in a feed direction. When the strapping band reaches the region of the end of the band guide channel, as is illustrated by way of example in highly schematized form in FIG. 1, the band strikes a stop, or the fact that the end of the band guide channel has been reached may be detected in some other way, for example by way of a light barrier. In this way, a signal is generated, by way of which the control of the strapping apparatus stops the motor drive movement of the roller 111 and—at least substantially at the same time—triggers the stroke movement of the piston 184 of the solenoid. In other embodiments of the present disclosure, it is also conceivable for the stoppage of the drive movement of the roller 111 and the start of the clearance-generating process to have a time offset with respect to one another, that is to say for the stoppage of the drive movement to be performed before or after the start of the clearance-generating process.

As a result of the starting of the clearance-generating process, the piston 184 deploys in the direction of the C-shaped element 183 and, here, acts by way of its end on the C-shaped or fork-shaped element. Owing to its arrangement on the eccentric 150, the eccentric is rotated during the stroke movement of the piston. In the exemplary embodiment and in the illustration of FIG. 18, the rotational movement of the eccentric takes place through a rotational angle of less than 90° counterclockwise. The rotational movement takes place counter to the spring force of the pressure-exerting spring 190, which in this case is compressed and is likewise articulated on the eccentric 150. As a result of the rotational movement, a clearance is generated between the counterpart roller 113 and the roller 111, that is to say the counterpart roller 113 is lifted from the roller 111, and the spacing between the two rollers 111, 113 is enlarged such that a gap forms between the rollers, which gap is larger than the band thickness.

In the case of generic strapping apparatuses, the strapping band, which is shot at high speed through the band channel of the band guide 6, has the tendency, owing to the sudden and abrupt stoppage of the band, to form convolutions between the rollers 111, 112, 113 and the end of the strapping channel. In particular in the region of the rollers 111, 112, 113, such convolutions can lead to malfunctions. Owing to the embodiment according to the present disclosure, in which a clearance of the counterpart roller 113 is generated, the band can, in particular immediately after the stoppage of the advancement, move freely counter to the advancement direction in the direction of the band supply to the extent required for that part of the band which is possibly excess in relation to the length of the band channel, and which causes the formation of convolutions, to move back in the band guide channel. The controller of the strapping apparatus can then subsequently deactivate the solenoid again. As a result, the solenoid is rendered inactive, whereby the pressure-exerting spring 190 can move the eccentric 150 back again counter to the previous direction of rotation, and thus move the counterpart roller 113 into its position of contact with the band again, in which the band is clamped between the roller 111 and the counterpart roller 113. The subsequent band retraction and tensioning process can be performed in the same way as in the embodiments of the present disclosure as per FIGS. 1 to 13.

| List of reference designations | |
|---|---|
| 1 | Strapping apparatus |
| 2 | Controller |
| 3 | Supply device |
| 5 | Strapping head |
| 6 | Band guide |
| 8 | Frame |
| 11 | Roller |
| 11a | Circumferential surface |
| 12 | Tensioning wheel |
| 12a | Circumferential surface of tensioning wheel |
| 13 | Counterpart roller |
| 14 | Motor |
| 14a | Mechanism device |
| 15 | Band drive device |
| 16 | Control component |
| 17 | Band handling component |
| 18 | Partial carrier |
| 19 | Main carrier |
| 20 | Band advancement device |
| 21 | Band retraction device |
| 22 | Tensioning device |
| 23 | Axle |
| 27 | Pivoting device |
| 28 | Band guide channel |
| 28a | Channel section |
| 28b | Outer delimitation |
| 29 | Interface |
| 30 | Clamping lever |
| 31 | Channel piece |
| 32 | Band advancement direction |
| 33 | Outer channel segment |
| 37 | Ring |
| 38 | Recess |
| 39 | Knurling/toothing |

-continued

| List of reference designations | |
|---|---|
| 40 | Groove |
| 43 | O-ring |
| 44 | O-ring |
| 45 | Ring |
| 48 | Band retraction direction |
| 50 | Eccentric |
| 51 | Shaft |
| 52 | Carrier |
| 53 | Receptacle |
| 54 | Bearing point |
| 56 | Parallelogram |
| 57 | Long vertical lever |
| 58 | Horizontal lever |
| 59 | Short vertical lever |
| 60 | Pivot bearing point |
| 61 | Pivot bearing point |
| 64 | Oblique surface |
| 65 | Bearing point |
| 66 | Carrier |
| 67 | Rotary axle |
| 68 | Rotary axle |
| 70 | Spring element |
| 71 | Articulation point |
| 72 | Peg |
| 101 | Strapping apparatus |
| 111 | Roller |
| 112 | Tensioning wheel |
| 112a | Circumferential surface |
| 112b | Part |
| 112c | Part |
| 113 | Counterpart roller |
| 114 | Screw |
| 115 | Band drive device |
| 137 | Ring |
| 140 | Groove |
| 143 | Ring section |
| 145 | Ring |
| 150 | Eccentric |
| 180 | Clearance device |
| 181 | Carrier |
| 182 | Bearing point |
| 183 | C-shaped element |
| 184 | Piston |
| 184a | Axis |
| 186 | Solenoid |
| 188 | Compression spring |
| 190 | Pressure-exerting spring |
| B | Width |
| H | Height |
| $H_1$ | Height |

The invention claimed is:

1. A tensioning device for an apparatus for strapping packaged articles with a strapping band, the tensioning device comprising:
    a tensioning wheel operatively connectable to a drive device to rotate the tensioning wheel about an axis of rotation, the tensioning wheel having a circumferential surface configured to engage the strapping band; and
    a spacer element mounted on the tensioning wheel such that the spacer element is movable between: (1) a first position in which at least part of the spacer element has a first spacing from the axis of rotation and projects from the circumferential surface of the tensioning wheel; and (2) a second position in which the at least part of the spacer element has a second spacing from the axis of rotation, wherein the second position is different from the first position and the second spacing is different from the first spacing.

2. The tensioning device of claim 1, wherein when in the second position, the at least part of the spacer element does not project from the circumferential surface of the tensioning wheel.

3. The tensioning device of claim 1, wherein the spacer element is movable from the first position to the second position via application of force to the at least part of the spacer element.

4. The tensioning device of claim 1, wherein the spacer element is coaxial with the tensioning wheel and rotatable with the tensioning wheel.

5. The tensioning device of claim 1, wherein the spacer element is disposed in a groove defined in the circumferential surface.

6. The tensioning device of claim 5, wherein the groove extends over at least part of the circumferential surface and the spacer element includes at least part of a ring.

7. The tensioning device of claim 5, which includes a resiliently elastic element disposed in the groove and against which the spacer element bears.

8. The tensioning device of claim 1, wherein the spacer element is positioned centrally in relation to the width of the circumferential surface of the tensioning wheel.

9. A strapping device for strapping packaged articles with a strapping band, the strapping device comprising:
  a tensioning device comprising:
    (a) a tensioning wheel operatively connectable to a drive device to rotate the tensioning wheel about an axis of rotation, the tensioning wheel having a circumferential surface configured to engage the strapping band; and
    (b) a spacer element mounted on the tensioning wheel such that the spacer element is movable between: (1) a first spacer element position in which at least part of the spacer element has a first spacing from the axis of rotation and projects from the circumferential surface of the tensioning wheel; and (2) a second spacer element position in which the at least part of the spacer element has a second spacing from the axis of rotation, wherein the second position is different from the first position and the second spacing is different from the first spacing; and
  a fastening device configured to join two sections of the strapping band.

10. The strapping device of claim 9, which includes a band advancement/retraction roller, a counterpart roller, and a motor operably connected to the band advancement/retraction roller to drive the band advancement/retraction roller in two different directions of rotation and also operably connected to the tensioning wheel to drive the tensioning wheel in at least one of the directions of rotation, wherein the counterpart roller is movable between a first counterpart roller position in which the counterpart roller contacts the band advancement/retraction roller and a second counterpart roller position in which the counterpart roller contacts the tensioning wheel.

11. The strapping device of claim 10, wherein the motor is the only motor operably connected to both the tensioning wheel and the band advancement/retraction roller.

12. The strapping device of claim 9, further comprising an encircling strapping channel configured to guide the strapping band during a strapping process.

\* \* \* \* \*